US011388442B2

(12) United States Patent
Zhang et al.

(10) Patent No.: US 11,388,442 B2
(45) Date of Patent: Jul. 12, 2022

(54) POINT CLOUD ENCODING METHOD, POINT CLOUD DECODING METHOD, ENCODER, AND DECODER

(71) Applicant: HUAWEI TECHNOLOGIES CO., LTD., Guangdong (CN)

(72) Inventors: Dejun Zhang, Shenzhen (CN); Tian Wang, Beijing (CN); Vladyslav Zakharchenko, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/217,404

(22) Filed: Mar. 30, 2021

(65) Prior Publication Data

US 2021/0219000 A1 Jul. 15, 2021

Related U.S. Application Data

(63) Continuation of application No. PCT/CN2019/103293, filed on Aug. 29, 2019.

(30) Foreign Application Priority Data

Sep. 30, 2018 (CN) .......................... 201811166410.8

(51) Int. Cl.
*H04B 1/66* (2006.01)
*H04N 7/12* (2006.01)
(Continued)

(52) U.S. Cl.
CPC ........... *H04N 19/70* (2014.11); *H04N 19/172* (2014.11); *H04N 19/177* (2014.11); *H04N 19/184* (2014.11)

(58) Field of Classification Search
CPC ................................ G06T 19/20; H04N 19/70
See application file for complete search history.

(56) References Cited

U.S. PATENT DOCUMENTS

2017/0347122 A1 11/2017 Chou et al.
2020/0344493 A1* 10/2020 Fleureau .............. H04N 13/161
(Continued)

FOREIGN PATENT DOCUMENTS

CN 107426559 A 12/2017
CN 107770540 A 3/2018
(Continued)

OTHER PUBLICATIONS

He et al., "Best-effort projection based attribute compression for 3D point cloud," 2017 23rd Asia-Pacific Conference on Communications (APCC), Dec. 2017, 6 pages.
(Continued)

*Primary Examiner* — Fabio S Lima
(74) *Attorney, Agent, or Firm* — Fish & Richardson P.C.

(57) ABSTRACT

Example point cloud encoding apparatus and point cloud decoding apparatus are provided for effectively encoding and decoding point cloud data. The point cloud encoding apparatus is configured for obtaining auxiliary information of a union occupancy map corresponding to a point cloud group, where the point cloud group includes N frames of point clouds, N≥2, and N is an integer. The union occupancy map is a union set of occupancy maps of N patches having a matching relationship in the N frames of point clouds, and the auxiliary information of the union occupancy map is used to determine auxiliary information of the N patches. A syntax element is encoded into a bitstream, where the syntax element includes the auxiliary information of the union occupancy map.

17 Claims, 9 Drawing Sheets

(51) Int. Cl.
*H04N 11/02* (2006.01)
*H04N 11/04* (2006.01)
*H04N 19/70* (2014.01)
*H04N 19/172* (2014.01)
*H04N 19/177* (2014.01)
*H04N 19/184* (2014.01)

(56) References Cited

U.S. PATENT DOCUMENTS

| | | | |
|---|---|---|---|
| 2020/0374559 A1* | 11/2020 | Fleureau | G06T 9/00 |
| 2021/0005006 A1* | 1/2021 | Oh | H04N 21/85406 |
| 2021/0201540 A1* | 7/2021 | Zhang | G06T 9/001 |
| 2021/0274147 A1* | 9/2021 | Fleureau | H04N 21/816 |

FOREIGN PATENT DOCUMENTS

| | | |
|---|---|---|
| CN | 110944187 A | 3/2020 |
| EP | 3737100 A1 | 11/2020 |
| WO | 2018130491 A1 | 7/2018 |

OTHER PUBLICATIONS

ITU-T H.263 (Jan. 2005), "Series H: Audiovisual and Multimedia Systems, Infrastructure of audiovisual services—Coding of moving video, Video coding for low bit rate communication," Jan. 2005, 226 pages.

ITU-T H.264 (Apr. 2017), "Series H: Audiovisual and Multimedia Systems, Infrastructure of audiovisual services—Coding of moving video, Advanced video coding for generic audiovisual services," Apr. 2017, 812 pages.

ITU-T H.265 (Feb. 2018), "Series H: Audiovisual and Multimedia Systems, Infrastructure of audiovisual services—Coding of moving video. High efficiency video coding," Feb. 2018, 692 pages.

PCT International Search Report and Written Opinion issued in International Application No. PCT/CN2019/103293 dated Nov. 20, 2019, 15 pages (with English translation).

Zhang et al., "Method and Apparatus for Temporally Consistent Patch Allocation for Volumetric Media," U.S. Appl. No. 62/655,019, filed Apr. 9, 2018, 31 pages.

Office Action issued in Chinese Application No. 201811166410.8 dated Aug. 13, 2021, 10 pages (with English translation).

3DG, "Algorithm description of mpeg-pcc-tmc2," International Organisation for Standardisation, ISO/IEC JTC1/SC29/WG11, Coding of Moving Pictures and Audio, San Diego, USA, Apr. 2018, 13 pages.

Extended European Search Report issued in European Application No. 19866951.7 dated Sep. 30, 2021, 12 pages.

Huawei Technologies, "A new patch side information encoding method for PCC TMC2," International Organisation for Standardisation, ISO/IEC JTC1/SC29/WG11, Coding of Moving Pictures and Audio, Gwangju, Korea, Jan. 2018, 4 pages.

Huawei Technologies, "TMC2 Improved Temporally Consistent Patch Packing (Temporally Consistent Multiframe Patch Packing—TCMPP)," International Organisation for Standardisation, ISO/IEC JTC1/SC29/WG11, Coding of Moving Pictures and Audio, San Diego, USA, Apr. 2018, 4 pages.

Huawei Technologies., "[VPCC] New proposal of a global patch allocation method," International Organisation for Standardisation, ISO/IEC JTC1/SC29/WG11, Coding of Moving Pictures and Audio, Macau, China, Oct. 2018, 4 pages.

Huawei Technologies Inc., "[PCC] TMC2 A differential coding method for patch side information," International Organisation for Standardisation, ISO/IEC JTC1/SC29/WG11, Coding of Moving Pictures and Audio, San Diego, USA, Apr. 2018, 15 pages.

Huawei Technologies Inc., "[PCC] TMC2 CE2.6 Report on Temporally consistent Patch packing," International Organisation for Standardisation, ISO/IEC JTC1/SC29/WG11, Coding of Moving Pictures and Audio, San Diego, USA, Apr. 2018, 7 pages.

* cited by examiner (a) (b) (c)

POINT CLOUD ENCODING METHOD, POINT CLOUD DECODING METHOD, ENCODER, AND DECODER

CROSS-REFERENCE TO RELATED APPLICATIONS

This application is a continuation of International Application No. PCT/CN2019/103293, filed on Aug. 29, 2019, which claims priority to Chinese Patent Application No. 201811166410.8, filed on Sep. 30, 2018. The disclosures of the aforementioned applications are hereby incorporated by reference in their entireties.

TECHNICAL FIELD

This application relates to the field of encoding and decoding technologies, and in particular, to a point cloud (point cloud) encoding method, a point cloud decoding method, an encoder, and a decoder.

BACKGROUND

With continuous development of a 3D sensor (for example, a 3D scanner) technology, it is increasingly convenient to collect point cloud data, and the point cloud data is collected on an increasingly large scale. Therefore, how to effectively encode the point cloud data becomes an urgent problem to be resolved.

SUMMARY

Embodiments of this application provide a point cloud encoding method, a point cloud decoding method, an encoder, and a decoder, to provide technical solutions for effectively encoding and decoding point cloud data. Specifically, the technical solutions help reduce bitstream transmission overheads without affecting encoding and decoding performance.

According to a first aspect, a point cloud encoding method is provided, including: obtaining auxiliary information of a union occupancy map corresponding to a point cloud group, where the point cloud group includes N frames of point clouds, N≥2, and N is an integer; the union occupancy map is a union set of the occupancy maps of N patches (patch) having a matching relationship in the N frames of point clouds; and the auxiliary information of the union occupancy map is used to determine (specifically, used by a decoder to determine) auxiliary information (auxiliary information) of the N patches; and encoding a syntax element into a bitstream, where the syntax element includes the auxiliary information of the union occupancy map. The technical solution may be performed by an encoder.

Each of the N patches is from one of the N frames of point clouds, and different patches are from different point clouds. For example, assuming that N=4, four patches having a matching relationship in the four frames of point clouds are respectively from or are respectively included in the four frames of point clouds. A patch having a matching relationship with another patch is a matched patch of a target patch, where the target patch is the another patch or a matched patch of the another patch. Each of the N patches may be referred to as a global matched patch (global matched patch).

Correlations between the union occupancy map and the occupancy maps of the N patches corresponding to the union occupancy map, for example, location information of the union occupancy map in a global occupancy map, correspond to location information of the occupancy maps of the N patches in occupancy maps of point clouds to which the N patches belong, and/or the union occupancy map is the union set of the occupancy maps of the N patches. Therefore, the auxiliary information of the union occupancy map may be used to represent or approximately represent the auxiliary information of the N patches. This can reduce bitstream transmission overheads without affecting encoding and decoding performance.

In a possible design, the auxiliary information of the union occupancy map includes at least one of the following information: coordinate values of the union occupancy map in a global occupancy map, size information of the union occupancy map in the global occupancy map, and corresponding coordinate values of the union occupancy map in a three-dimensional space. The global occupancy map is an occupancy map obtained by packing a plurality of union occupancy maps corresponding to the point cloud group.

The coordinate values of the union occupancy map in the global occupancy map include u0 and/or v0 of the union occupancy map.

The size information of the union occupancy map in the global occupancy map includes sizeU0 and/or sizeV of the union occupancy map.

The corresponding coordinate values of the union occupancy map in the three-dimensional space are minimum (or maximum) coordinate values that are of the N patches corresponding to the union occupancy map and that are in the three-dimensional space. Minimum coordinate values are used as an example. The corresponding coordinate values of the union occupancy map in the three-dimensional space may include a minimum value of u1, a minimum value of v1, and/or a minimum value of d1 of the N patches in the three-dimensional space.

In a possible design, the syntax element further includes a difference between corresponding auxiliary information of one or more patches in the N patches and the auxiliary information of the union occupancy map. The corresponding auxiliary information of the one or more patches is a same type of auxiliary information as the auxiliary information of the union occupancy map. For example, both are u0. In this possible design, a differential manner is used to transmit the auxiliary information of the one or more patches corresponding to the union occupancy map. This helps improve accuracy and/or setting flexibility of the auxiliary information of the one or more patches in the N patches. During specific implementation, optionally, if auxiliary information of a patch in the N patches is the same as the auxiliary information of the union occupancy map, a difference between the auxiliary information of the patch and the auxiliary information of the union occupancy map is 0. In this case, the difference may not be encoded into the bitstream.

In a possible design, the obtaining auxiliary information of a union occupancy map corresponding to a point cloud group includes: obtaining the auxiliary information of the union occupancy map based on the auxiliary information of the N patches.

In a possible design, the obtaining the auxiliary information of the union occupancy map based on the auxiliary information of the N patches includes:

when the auxiliary information of the union occupancy map includes the coordinate values of the union occupancy map in the global occupancy map, using maximum coordinate values or minimum coordinate values of the occupancy maps of the N patches in occupancy maps of corresponding point clouds as the coordinate values of the union occupancy map in the global occupancy map, for example, using a minimum value or a maximum value of u0 of the occupancy maps of the N patches as u0 of the union occupancy map, and/or using a minimum value or a maximum value of v of the occupancy maps of the N patches as v0 of the union occupancy map; and/or when the auxiliary information of the union occupancy map includes the size information of the union occupancy map in the global occupancy map, using information about a maximum size of the occupancy maps of the N patches in occupancy maps of corresponding point clouds as the size information of the union occupancy map in the global occupancy map, for example, using a maximum value of sizeU0 of the occupancy maps of the N patches as sizeV0 of the union occupancy map, and/or using a maximum value of sizeU0 of the occupancy maps of the N patches as sizeV0 of the union occupancy map; and/or when the auxiliary information of the union occupancy map includes the corresponding coordinate values of the union occupancy map in the three-dimensional space, using maximum coordinate values or minimum coordinate values of the N patches in corresponding point clouds as the corresponding coordinate values of the union occupancy map in the three-dimensional space, for example, when a minimum coordinate value is used as an example, using a minimum value of u1 of the N patches as a value of u1 of the union occupancy map, using a minimum value of v1 of the N patches as a value of v1 of the union occupancy map, and using a minimum value of d1 of the N patches as a value of d1 of the union occupancy map.

Coordinate values of an occupancy map of a patch in an occupancy map of a corresponding point cloud are coordinate values of the occupancy map of the patch in an occupancy map of a point cloud to which the patch belongs. Coordinate values of a patch in a corresponding point cloud are coordinate values of the patch in a point cloud to which the patch belongs.

In a possible design, the method further includes: reconstructing the N frames of point clouds based on auxiliary information of a plurality of patches (for example, all patches) in the N frames of point clouds. The plurality of patches include the N patches.

In a possible design, the point cloud group is a group of frames (group of frame, GOF) GOF or a sub-GOF, and the sub-GOF includes a plurality of frames of point clouds that are consecutive in one GOF.

In a possible design, if the point cloud group is the sub-GOF, the syntax element further includes information, such as a number of a start frame in the sub-GOF and/or a quantity of frames included in the sub-GOF, indicating a location that is of a point cloud (for example, each frame of point cloud) included in the sub-GOF and that is in a GOF to which the sub-GOF belongs.

According to a second aspect, a point cloud decoding method is provided, including: parsing a bitstream to obtain a syntax element, where the syntax element includes auxiliary information of a union occupancy map corresponding to a point cloud group; the point cloud group includes N frames of point clouds, N≥2, and N is an integer; the union occupancy map is a union set of occupancy maps of N patches having a matching relationship in the N frames of point clouds; determining auxiliary information of the N patches based on the auxiliary information that is of the union occupancy map and that is obtained through parsing; and reconstructing the N frames of point clouds based on auxiliary information of a plurality of patches in the N frames of point clouds, where the plurality of patches include the N patches. The technical solution may be performed by a decoder. Optionally, the method may further include: displaying the reconstructed point clouds.

In a possible design, the auxiliary information of the union occupancy map includes at least one of the following information: coordinate values of the union occupancy map in a global occupancy map, size information of the union occupancy map in the global occupancy map, and corresponding coordinate values of the union occupancy map in a three-dimensional space. The global occupancy map is an occupancy map obtained by packing a plurality of union occupancy maps corresponding to the point cloud group.

In a possible design, the syntax element further includes a difference between corresponding auxiliary information of one or more patches in the N patches and the auxiliary information of the union occupancy map. In this case, the determining auxiliary information of the N patches based on the auxiliary information that is of the union occupancy map and that is obtained through parsing includes: determining the auxiliary information of the N patches based on the auxiliary information that is of the union occupancy map and that is obtained through parsing and the difference between the corresponding auxiliary information of the one or more patches in the N patches and the auxiliary information of the union occupancy map. For example, the auxiliary information of the union occupancy map and a difference between corresponding auxiliary information of one of the N patches and the auxiliary information of the union occupancy map are summed up, to obtain the corresponding auxiliary information of the patch.

In a possible design, the point cloud group is a GOF or a sub-GOF, and the sub-GOF includes a plurality of frames of point clouds that are consecutive in one GOF.

In a possible design, if the point cloud group is the sub-GOF, the syntax element further includes information, such as a number of a start frame in the sub-GOF and/or a quantity of frames included in the sub-GOF, indicating a location that is of each frame of point cloud included in the sub-GOF and that is in a GOF to which the sub-GOF belongs. In this case, the method further includes: determining, based on the information that is obtained through parsing and that indicates the location that is of each frame of point cloud included in the sub-GOF and that is in the GOF to which the sub-GOF belongs, the location that is of each frame of point cloud included in the sub-GOF and that is in the GOF to which the sub-GOF belongs.

The second aspect or any one of the possible designs provided in the second aspect corresponds to the first aspect or a corresponding possible design of the first aspect. Therefore, for explanations of related content, specific implementations, and descriptions of beneficial effects in the second aspect or any one of the possible designs provided in the second aspect, refer to the descriptions in the first aspect or the possible designs of the first aspect. Alternatively, the explanations of related content, specific implementations, and descriptions of beneficial effects in the second aspect or any one of the possible designs provided in the second aspect may be inferred from the descriptions in the first aspect or the possible designs of the first aspect. Details are not described herein again.

According to a third aspect, a point cloud encoding method is provided, including: determining indication information, and encoding the indication information into a bitstream, where the indication information indicates whether to use a target point cloud encoding method to encode auxiliary information of N patches in a point cloud group; the target point cloud encoding method includes the point cloud encoding method according to any one of the first aspect or the possible designs provided in the first aspect: the point cloud group includes N frames of point clouds, where N≥2, and N is an integer; and the N patches are N patches having a matching relationship in the N frames of point clouds. In other words, the technical solution provided in this embodiment of this application is a technical solution supporting selection of a target point cloud encoding method from at least two candidate point cloud encoding methods.

According to a fourth aspect, a point cloud decoding method is provided, including: parsing a bitstream to obtain indication information, where the indication information indicates whether to use a target point cloud decoding method to decode auxiliary information of N patches in a point cloud group; the target point cloud decoding method includes the point cloud decoding method according to any one of the second aspect or the possible designs provided in the second aspect; the point cloud group includes N frames of point clouds, N≥2, and N is an integer; and the N patches are N patches having a matching relationship in the N frames of point clouds and when the indication information indicates to use the target point cloud decoding method to perform decoding, processing the auxiliary information of the N patches by using the target point cloud decoding method. In other words, the technical solution provided in this embodiment of this application is a technical solution supporting selection of a target point cloud decoding method from at least two candidate point cloud decoding methods.

According to a fifth aspect, an encoder is provided, including: modules configured to perform the method according to any one of the first aspect or the possible designs of the first aspect, or modules configured to perform the method according to any one of the third aspect or possible designs of the third aspect.

In a possible implementation, the encoder may be divided into functional modules based on the method according to any one of the first aspect/the third aspect or the possible implementations of the first aspect/the third aspect. For example, each functional module may be obtained through division based on each corresponding function, or two or more functions may be integrated into one processing module.

In a possible implementation, the encoder includes a packing module and an auxiliary information encoding module.

For example, when the encoder is applied to the technical solution in the first aspect, the packing module is configured to obtain auxiliary information of a union occupancy map corresponding to a point cloud group, where the point cloud group includes N frames of point clouds, N≥2, and N is an integer; the union occupancy map is a union set of occupancy maps of N patches having a matching relationship in the N frames of point clouds; and the auxiliary information of the union occupancy map is used to determine auxiliary information of the N patches. The auxiliary information encoding module is configured to encode a syntax element into a bitstream, where the syntax element includes the auxiliary information of the union occupancy map.

For another example, when the encoder is applied to the technical solution in the third aspect, the packing module is configured to determine indication information, where the indication information indicates whether to use a target point cloud encoding method to encode auxiliary information of N patches in a point cloud group; the target point cloud encoding method includes the point cloud encoding method according to any one of the first aspect or the possible designs provided in the first aspect; the point cloud group includes N frames of point clouds, N≥2, and N is an integer; and the N patches are N patches having a matching relationship in the N frames of point clouds. The auxiliary information encoding module is configured to encode the indication information into a bitstream.

According to a sixth aspect, a decoder is provided, including: modules configured to perform the method according to any one of the second aspect or the possible designs of the second aspect, or modules configured to perform the method according to any one of the fourth aspect or possible designs of the fourth aspect.

In a possible implementation, the decoder may be divided into functional modules based on the method according to any one of the second aspect/the fourth aspect or the possible implementations of the second aspect/the fourth aspect. For example, each functional module may be obtained through division based on each corresponding function, or two or more functions may be integrated into one processing module.

In a possible implementation, the decoder includes an auxiliary information decoding module and a point cloud reconstruction module.

For example, when the decoder is applied to the technical solution in the second aspect, the auxiliary information decoding module is configured to: parse a bitstream to obtain a syntax element, where the syntax element includes auxiliary information of a union occupancy map corresponding to a point cloud group, and the union occupancy map is a union set of occupancy maps of N patches having a matching relationship in N frames of point clouds; and determine auxiliary information of the N patches based on the auxiliary information that is of the union occupancy map and that is obtained through parsing. The point cloud reconstruction module is configured to reconstruct the N frames of point clouds based on auxiliary information of a plurality of patches in the N frames of point clouds, where the plurality of patches include the N patches.

For another example, when the decoder is applied to the technical solution in the fourth aspect, the auxiliary information decoding module is configured to: parse a bitstream to obtain indication information, where the indication information indicates whether to use a target point cloud decoding method to decode auxiliary information of N patches in a point cloud group; the target point cloud decoding method includes the point cloud decoding method according to any one of the second aspect or the possible designs provided in the second aspect; the point cloud group includes N frames of point clouds, N≥2, and N is an integer; and the N patches are N patches having a matching relationship in the N frames of point clouds; and when the indication information indicates to use the target point cloud decoding method to perform decoding, decode the auxiliary information of the N patches by using the target point cloud decoding method. The point cloud reconstruction module is configured to reconstruct the N frames of point clouds based on auxiliary information that is of a plurality of patches in the N frames of point clouds and that is obtained through decoding, where the plurality of patches include the N patches.

According to a seventh aspect, a point cloud data encoding device is provided. The device may include:
a memory, configured to store point cloud data; and
an encoder, configured to perform the point cloud encoding method according to any one of the first aspect or the possible designs of the first aspect or any one of the third aspect or possible designs of the third aspect.

According to an eighth aspect, an encoding apparatus is provided. The apparatus includes a memory and a processor. The memory is configured to store program code. The processor is configured to invoke the program code, to perform the point cloud encoding method according to any one of the first aspect or the possible designs of the first aspect or any one of the third aspect or possible designs of the third aspect.

According to a ninth aspect, a point cloud data decoding device is provided. The device may include:

a memory, configured to store point cloud data; and a decoder, configured to perform the point cloud decoding method according to any one of the second aspect or the possible designs of the second aspect or any one of the fourth aspect or possible designs of the fourth aspect.

According to a tenth aspect, a decoding apparatus is provided. The apparatus includes a memory and a processor. The memory is configured to store program code. The processor is configured to invoke the program code, to perform the point cloud decoding method according to any one of the second aspect or the possible designs of the second aspect or any one of the fourth aspect or possible designs of the fourth aspect.

According to an eleventh aspect, a computer-readable storage medium is provided. The computer-readable storage medium stores program code. When the program code is run on a computer, the computer is enabled to perform some or all steps of the point cloud encoding method according to any one of the first aspect or the possible designs of the first aspect or any one of the third aspect or possible designs of the third aspect.

According to a twelfth aspect, a computer program product is provided. When the computer program product runs on a computer, the computer is enabled to perform some or all steps of the point cloud encoding method according to any one of the first aspect or the possible designs of the first aspect or any one of the third aspect or possible designs of the third aspect.

According to a thirteenth aspect, a computer-readable storage medium is provided. The computer-readable storage medium stores program code. When the program code is run on a computer, the computer is enabled to perform some or all steps of the point cloud decoding method according to any one of the second aspect or the possible designs of the second aspect or any one of the fourth aspect or possible designs of the fourth aspect.

According to a fourteenth aspect, a computer program product is provided. When the computer program product runs on a computer, the computer is enabled to perform some or all steps of the point cloud decoding method according to any one of the second aspect or the possible designs of the second aspect or any one of the fourth aspect or possible designs of the fourth aspect.

It should be understood that, for beneficial effects of the related apparatus/device/computer-readable storage medium/computer program product provided above, refer to the beneficial effects of the method embodiments provided in the corresponding aspects. Details are not described herein again.

It should be understood that the term "at least one piece (type/frame)" in the embodiments of this application includes one piece (type/frame) or more pieces (types/frames). "A plurality of pieces (types/frames)" means two pieces (types/frames) or more than two pieces (types/frames). For example, at least one of A, B, and C includes the following cases: Only A exists, only B exists, only C exists, both A and B exist, both A and C exist, both B and C exist, and A, B, and C exist. The term "and/or" in the embodiments of this application describes only an association relationship for describing associated objects and represents that three relationships may exist. For example, A and/or B may represent the following three cases: Only A exists, both A and B exist, and only B exists. The term character "/" in the embodiments of this application usually represents an "or" relationship between associated objects. The character "/" in a formula represents a division operation. For example, A/B represents that A is divided by B.

DESCRIPTION OF EMBODIMENTS

For ease of understanding of the technical solutions provided in the embodiments of this application, the following describes technologies and terms used in the embodiments of this application.

In a moving picture expert group (moving picture expert group, MPEG) point cloud encoding method, an encoder first partitions a to-be-encoded point cloud (that is, a current frame or a current frame of point cloud) into several patches according to a specific rule. These patches do not have an overlapping region. Then, each patch is projected from a three-dimensional space to a two-dimensional plane, to obtain a two-dimensional image (that is, an occupancy map of the patch). Next, occupancy maps of all patches (or occupancy maps that are of patches and that are obtained after resolution is reduced) are closely arranged on one two-dimensional image according to a specific rule, to obtain an occupancy map of the current frame. This method for arranging an occupancy map of a patch is referred to as packing (packing). Specifically, the patches in the point cloud are arranged in a specific order, for example, arranged in descending order of the widths/heights of the occupancy maps of the patches; and then the occupancy maps of the patches are successively inserted into an available region of an occupancy map of the point cloud in order of the arranged patches, to obtain the occupancy map of the point cloud. Subsequently, a depth map of the current frame and a texture map of the current frame are generated according to a packing sequence. To be specific, the depth map of the current frame is a two-dimensional image that is generated by packing, according to the packing sequence, depth maps obtained by projecting all the patches; and the texture map of the current frame is a two-dimensional image that is generated by packing, according to the packing sequence, texture maps obtained by projecting all the patches. The occupancy map of the current frame is a two-dimensional binary image, and used to indicate whether a location of each pixel of the two-dimensional image is occupied by a point in the point cloud. Generally, to reduce a quantity of coded bits, resolution of the occupancy map of the current frame is lower than resolution of the depth map of the current frame and resolution of the texture map of the current frame. For ease of description, the following provides descriptions by using an example in which whether resolution is reduced is not considered.

Figure 1:
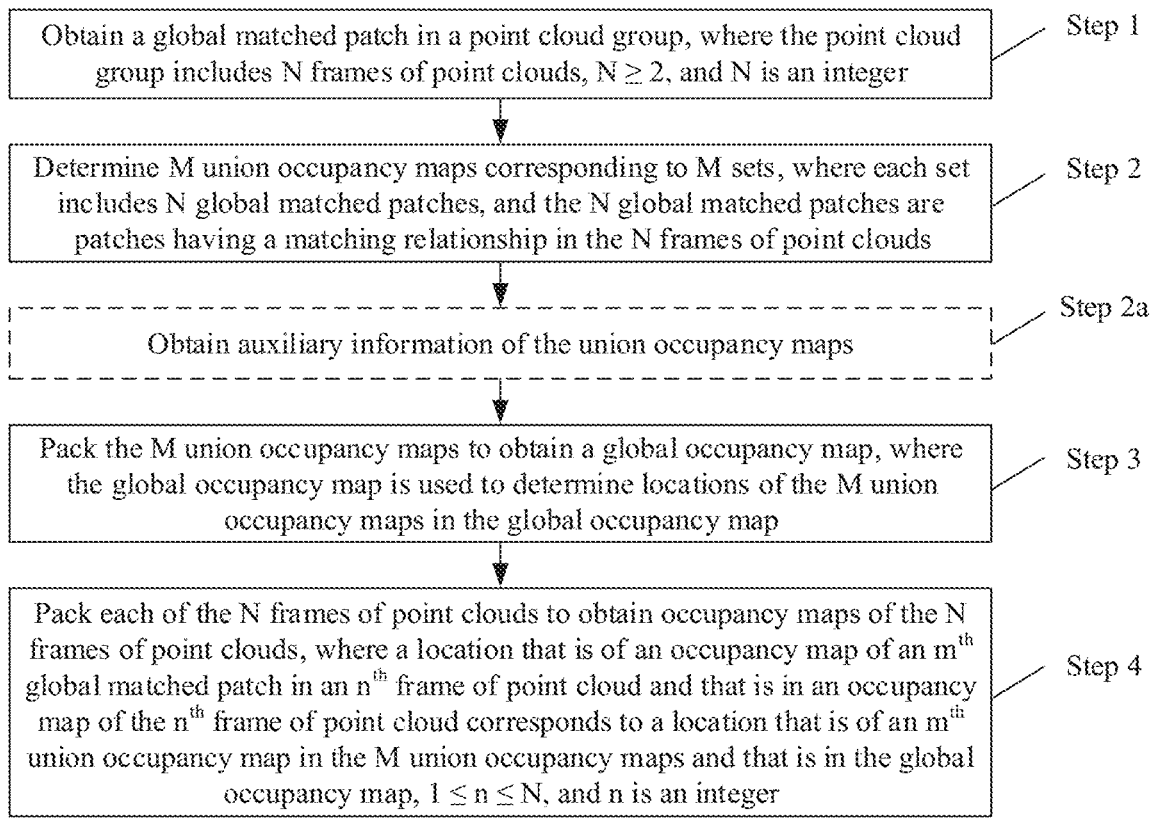
FIG. 1 is a schematic flowchart of an example packing method that is applicable to an embodiment of this application.

To improve coding or compression efficiency, a packing method is shown in FIG. 1. The method shown in FIG. 1 includes the following steps.

Step 1: Obtain a global matched patch in a point cloud group. The point cloud group includes N frames of point clouds, where N≥2, and N is an integer.

A global matched patch in a frame of point cloud is a patch that is in the frame of point cloud and that has a matching relationship with a patch that can be found in each frame of point cloud other than the frame of point cloud in a point cloud group. In addition, a patch having a matching relationship with the patch is a global matched patch. A patch having a matching relationship with another patch is a matched patch of a target patch, where the target patch is the another patch or a matched patch of the another patch. Optionally, a matched patch, in another frame of point cloud, of a patch in a frame of point cloud may be a patch that is in the another frame of point cloud and whose intersection over union (intersection over union, IoU) with the patch is the largest and greater than or equal to a preset threshold.

A quantity of patches having a matching relationship with any global matched patch is N−1.

Step 2: Determine M union occupancy maps corresponding to M sets, where each set includes N global matched patches, and the N global matched patches are patches having a matching relationship in the N frames of point clouds (or patches that have a matching relationship and that are in the N frames of point clouds). Optionally, a union occupancy map corresponding to an $m^{th}$ set is a union set of occupancy maps of all global matched patches in the $m^{th}$ set, where 1≤m≤M, and both m and M are integers.

The union occupancy map may also be referred to as a union patch occupancy map.

That N global matched patches included in one set are patches that have a matching relationship and that are in the N frames of point clouds may be understood as: Each of the N global matched patches is from (or belongs to) one frame of point cloud, different global matched patches are from different point clouds, and the N global matched patches have a matching relationship.

A union occupancy map corresponding to a set to which a global matched patch belongs includes an occupancy map of the global matched patch.

Optionally, after an encoder performs step 2, the method may further include the following step:

Step 2a: Obtain auxiliary information of the union occupancy maps. For specific descriptions of auxiliary information of a union occupancy map, a specific implementation of obtaining the auxiliary information of the union occupancy map, and the like, refer to descriptions below. Details are not described herein. Certainly, a sequence of performing step 2a and steps 3 and 4 is not limited in this embodiment of this application.

Step 3: Pack the M union occupancy maps to obtain a global occupancy map (namely, a final occupancy map). The global occupancy map is used to determine locations of the M union occupancy maps in the global occupancy map. A packing process may be considered as a process of updating the global occupancy map. For example, the M union occupancy maps are arranged in an available space in the global occupancy map in an order from top to bottom and left to right, to obtain the final occupancy map. For a specific method, refer to the conventional technology. Details are not described herein.

Step 4: Pack each of the N frames of point clouds to obtain occupancy maps of the N frames of point clouds, where a location (a first location) that is of an occupancy map of an $m^{th}$ global matched patch in an $n^{th}$ frame of point cloud and that is in an occupancy map of the $n^{th}$ frame of point cloud corresponds to a location (a second location) that is of an ma union occupancy map in the M union occupancy maps and that is in the global occupancy map, 1≤n≤N, and n is an integer.

That the first location corresponds to the second location may include the following: Coordinate values of the first location are the same as coordinate values of the second location; or coordinate values of the first location in a coordinate system including the first location are substantially the same as coordinate values of the second location in a coordinate system including the second location; or coordinate values of the first location are different from coordinate values of the second location, but a location range including the second location includes a location range including the first location. The coordinate values of the first location may be represented by location coordinates that are of the occupancy map of the $m^{th}$ global matched patch in the $n^{th}$ frame of point cloud and that is in the occupancy map of the n frame of point cloud. The coordinate values of the second location may be represented by location coordinates of the $m^{th}$ union occupancy map in the global occupancy map. The location range including the first location is a region occupied by the occupancy map of the $m^{th}$ global matched patch, and the location range including the second location is a region occupied by the $m^{th}$ union occupancy map.

The following provides a further description of the packing method in FIG. 1 by using a simple example.

Figure 2:
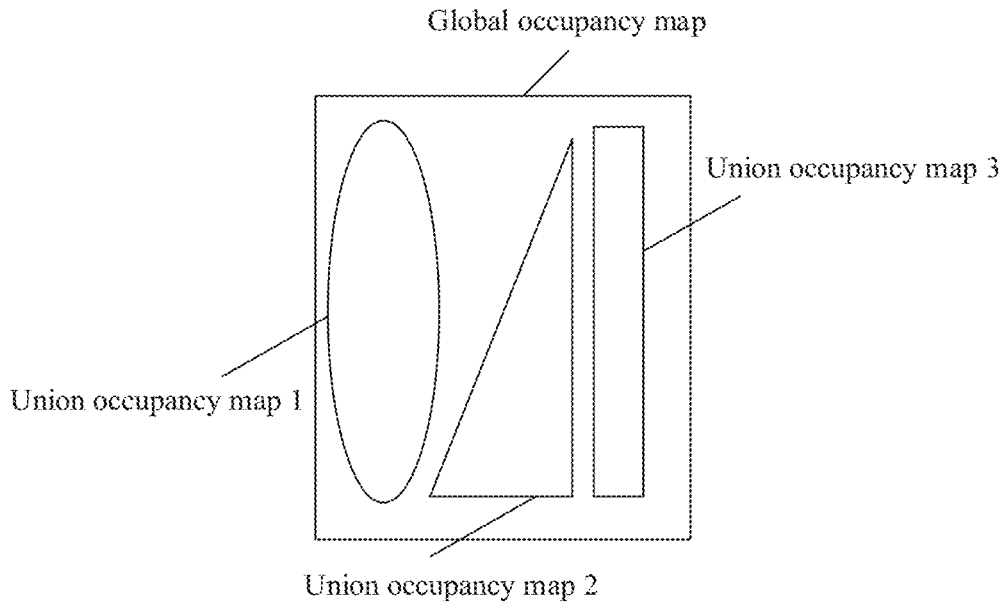
FIG. 2 and FIG. 3 are schematic diagrams of an example process based on the packing method shown in FIG. 1.
Figure 3:
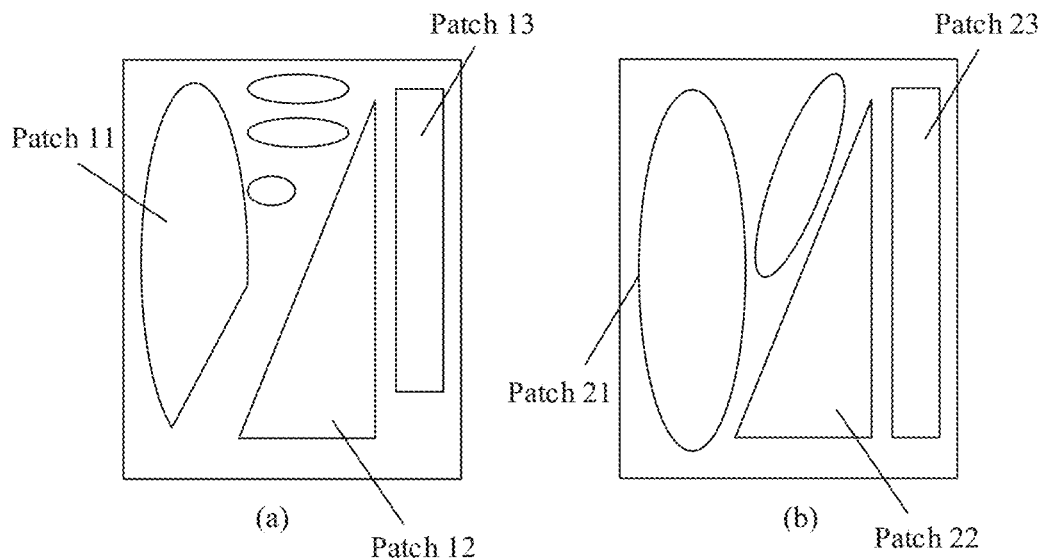

FIG. 2 and FIG. 3 are schematic diagrams of an example process based on the packing method shown in FIG. 1. In FIG. 2 and FIG. 3, it is assumed that a point cloud group includes four frames of point clouds, each frame of point cloud includes 10 patches, and global matched patches are: a patch 11, a patch 12, and a patch 13 in a point cloud 1; a patch 21, a patch 22, and a patch 23 in a point cloud 2; a patch 31, a patch 32, and a patch 33 in a point cloud 3; and a patch 41, a patch 42, and a patch 43 in a point cloud 4. In addition, the patch 11, the patch 21, the patch 31, and the patch 41 have a matching relationship, and these patches form a set 1. The patch 12, the patch 22, the patch 32, and the patch 42 have a matching relationship, and these patches form a set 2. The patch 13, the patch 23, the patch 33, and the patch 43 have a matching relationship, and these patches form a set 3. In other words, the M sets are specifically the sets 1 to 3, and each set includes four patches having a matching relationship.

A global occupancy map obtained based on this example may be shown in FIG. 2. A larger rectangle in FIG. 2 represents a global occupancy map; and an ellipse, a triangle, and a smaller rectangle in FIG. 2 respectively represent union patch occupancy maps corresponding to the sets 1 to 3.

Based on this example, after step 4 is performed, an occupancy map of the point cloud 1 may be shown in (a) in FIG. 3, and an occupancy map of the point cloud 2 may be shown in (b) in FIG. 3. FIG. 3 merely shows occupancy maps that are of some patches and that are in the occupancy map of the point cloud 1 and occupancy maps that are of some patches and that are in the occupancy map of the point cloud 2, and does not show occupancy maps of the point cloud 3 and the point cloud 4.

It can be learned by comparing FIG. 2 and FIG. 3 that both a location that is of an occupancy map of the patch 11 and that is in the occupancy map of the point cloud 1 and a location that is of an occupancy map of the patch 21 and that is in the occupancy map of the point cloud 2 correspond to a location of a union patch occupancy map 1 in the global occupancy map; both a location that is of an occupancy map of the patch 12 and that is in the occupancy map of the point cloud 1 and a location that is of an occupancy map of the patch 22 and that is in the occupancy map of the point cloud 2 correspond to a location of a union patch occupancy map 2 in the global occupancy map; and both a location that is of an occupancy map of the patch 13 and that is in the occupancy map of the point cloud 1 and a location that is of an occupancy map of the patch 23 and that is in the occupancy map of the point cloud 2 correspond to a location of a union patch occupancy map 3 in the global occupancy map.

In an example, for explanations of related content and descriptions of a specific implementation in the technical solution shown in FIG. 1, reference may be made to, for example, but not limited to, another patent previously applied for by the applicant.

According to a conventional point cloud encoding method, an encoder needs to encode information about all patches in one frame of point cloud into a bitstream. This causes relatively high bitstream transmission overheads. Therefore, the embodiments of this application provide a point cloud encoding method, a point cloud decoding method, an encoder, and a decoder, to reduce bitstream transmission overheads without affecting encoding and decoding performance.

A coordinate system defined in a point cloud coding system is first described to describe information about a patch. For a frame-level occupancy map (a two-dimensional image), usually, a horizontal axis is defined as a U0 axis, and a vertical axis is defined as a V0 axis. For a point cloud (in a three-dimensional space), usually, a horizontal axis is defined as a U1 axis, a vertical axis is defined as a V1 axis, and a coordinate axis perpendicular to the U1 axis and the V1 axis is defined as a D1 axis. In other words, the U1 axis is an X axis in a world coordinate system, the V1 axis is a Y axis in the world coordinate system, and the D1 axis is a Z axis in the world coordinate system.

An example and descriptions of information about a patch are shown in the following Table 1.

TABLE 1

| Information about a patch | Description |
| --- | --- |
| u0 | Coordinate value of a patch-level occupancy map on a U0 coordinate axis for a frame-level occupancy map |
| v0 | Coordinate value of a patch-level occupancy map on a V0 coordinate axis for a frame-level occupancy map |
| sizeU0 | Width (namely, a value on a U0 axis) of a patch-level occupancy map in a frame-level occupancy map |
| sizeV0 | Height (namely, a value on a V0 axis) of a patch-level occupancy map in a frame-level occupancy map |
| u1 | Coordinate value of the patch on a U1 coordinate axis in a three-dimensional space |
| v1 | Coordinate value of the patch on a V1 coordinate axis in a three-dimensional space |
| d1 | Coordinate value of the patch on a D1 coordinate axis in a three-dimensional space |

Based on Table 1, when a patch-level occupancy map is an occupancy map of a patch in a point cloud, a frame-level occupancy map may be an occupancy map of the point cloud. When a patch-level occupancy map is a union occupancy map, a frame-level occupancy map may be a global occupancy map. In the following, for explanations of information about a patch, refer to Table 1. A general description is provided herein, and details are not described below.

The following describes a schematic block diagram of a system architecture and a schematic block diagram of an apparatus that are applicable to the embodiments of this application.

Figure 4:
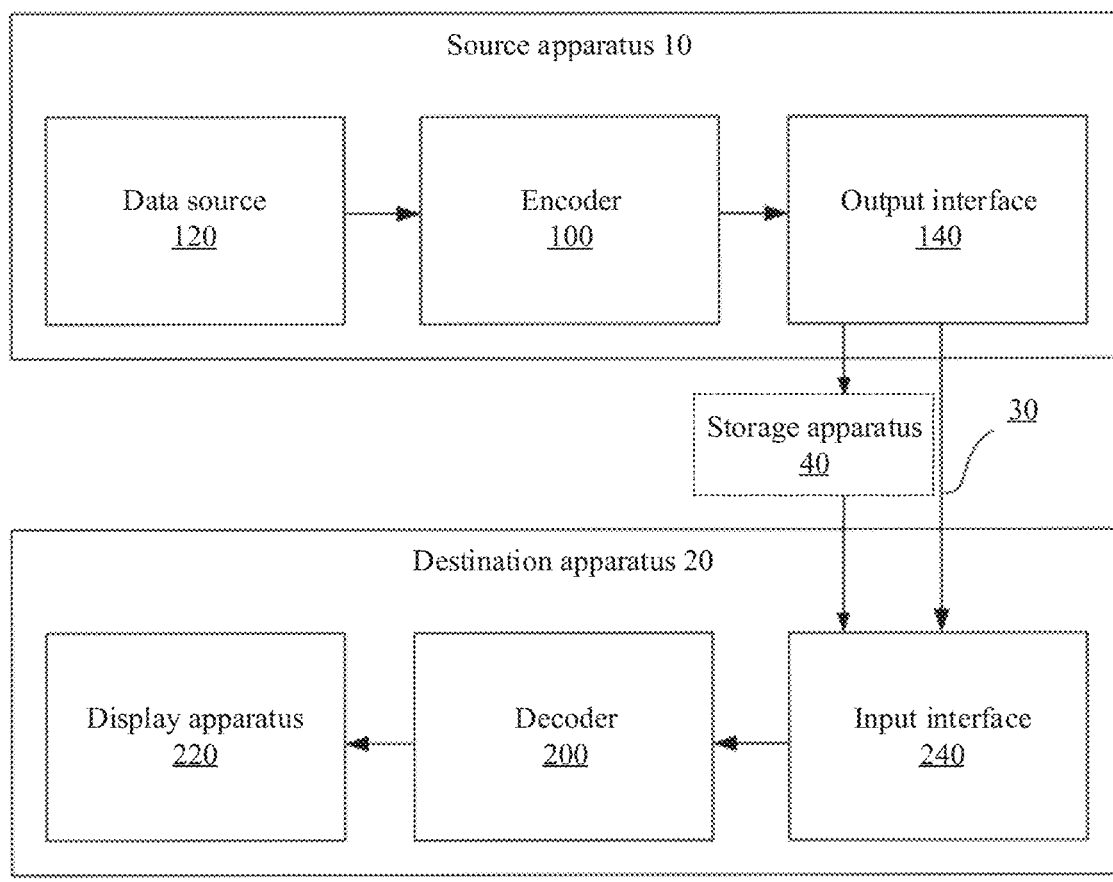
FIG. 4 is a schematic block diagram of an example point cloud coding system that is applicable to an embodiment of this application.

FIG. 4 is a schematic block diagram of an example point cloud coding system 1 that is applicable to an embodiment of this application. The term "point cloud coding" or "coding" may usually be point cloud encoding or point cloud decoding. An encoder 100 in the point cloud coding system 1 may encode a to-be-encoded point cloud according to any point cloud encoding method provided in this application. A decoder 200 in the point cloud coding system 1 may decode a to-be-decoded point cloud according to a point cloud decoding method that is provided in this application and that corresponds to a point cloud encoding method used by the encoder.

As shown in FIG. 4, the point cloud coding system 1 includes a source apparatus 10 and a destination apparatus 20. The source apparatus 10 generates encoded point cloud data. Therefore, the source apparatus 10 may be referred to as a point cloud encoding apparatus. The destination apparatus 20 may decode the encoded point cloud data generated by the source apparatus 10. Therefore, the destination apparatus 20 may be referred to as a point cloud decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random access memory (random access memory, RAM), a read-only memory (read-only memory, ROM), an electrically erasable programmable read-only memory (electrically erasable programmable read-only memory, EEPROM), a flash memory, or any other medium that can be used to store desired program code in a form of an instruction or a data structure that can be accessed by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, and a similar apparatus.

The destination apparatus 20 may receive the encoded point cloud data from the source apparatus 10 over a link 30. The link 30 may include one or more media or apparatuses that can transfer the encoded point cloud data from the source apparatus 10 to the destination apparatus 20. In an example, the link 30 may include one or more communications media that enable the source apparatus 10 to directly send the encoded point cloud data to the destination apparatus 20 in real time. In this example, the source apparatus 10 may modulate the encoded point cloud data according to a communication standard (for example, a wireless communication protocol), and may send modulated point cloud data to the destination apparatus 20. The one or more communications media may include a wireless and/or wired communications medium, for example, a radio frequency (radio frequency, RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded point cloud data may be accessed from the storage apparatus 40 through an input interface 240. The storage apparatus 40 may include any one of a plurality of distributed data storage media or locally accessible data storage media, for example, a hard disk drive, a Blu-ray disc, a digital versatile disc (digital versatile disc, DVD), a compact disc read-only memory (compact disc read-only memory, CD-ROM), a flash memory, a volatile or nonvolatile memory, or any other appropriate digital storage medium configured to store the encoded point cloud data.

In another example, the storage apparatus 40 may correspond to a file server or another intermediate storage apparatus that can store the encoded point cloud data generated by the source apparatus 10. The destination apparatus 20 may access the stored point cloud data through streaming transmission or downloading from the storage apparatus 40. The file server may be any type of server that can store the encoded point cloud data and send the encoded point cloud data to the destination apparatus 20. An example of the file server includes a network server (for example, used for a website), a file transfer protocol (file transfer protocol, FTP) server, a network attached storage (network attached storage, NAS) apparatus, or a local disk drive. The destination apparatus 20 may access the encoded point cloud data through any standard data connection (including an internet connection). The standard data connection may include a wireless channel (for example, a Wi-Fi connection), a wired connection (for example, a digital subscriber line (digital subscriber line, DSL) or a cable modem), or a combination thereof that is suitable for access to the encoded point cloud data stored on the file server. Transmission of the encoded point cloud data from the storage apparatus 40 may be streaming transmission, downloading transmission, or a combination thereof.

The point cloud coding system 1 described in FIG. 4 is merely an example, and technologies in this application are applicable to a point cloud coding (for example, point cloud encoding or point cloud decoding) apparatus that does not necessarily include any data communication between a point cloud encoding apparatus and a point cloud decoding apparatus. In another example, data is retrieved from a local memory, is transmitted on a network in a streaming manner, and the like. The point cloud encoding apparatus may encode the data and store the data to the memory, and/or the point cloud decoding apparatus may retrieve the data from the memory and decode the data. In many examples, apparatuses that do not communicate with each other and that only encode data and store the data to the memory and/or only retrieve data from the memory and decode the data perform encoding and decoding.

In the example in FIG. 4, the source apparatus 10 includes a data source 120, the encoder 100, and the output interface 140. In some examples, the output interface 140 may include a modulator/demodulator (a modem) and/or a transmitter. The data source 120 may include a point cloud capture apparatus (for example, a camera), a point cloud archive including previously captured point cloud data, a point cloud feed-in interface configured to receive point cloud data from a point cloud content provider, a computer graphics system configured to generate point cloud data, or a combination of these sources of point cloud data.

The encoder 10 may encode the point cloud data from the data source 120. In some examples, the source apparatus 10 directly sends the encoded point cloud data to the destination apparatus 20 through the output interface 140. In another example, the encoded point cloud data may alternatively be stored on the storage apparatus 40, so that the destination apparatus 20 subsequently accesses the encoded point cloud data for decoding and/or playing.

In the example in FIG. 4, the destination apparatus 20 includes the input interface 240, the decoder 200, and a display apparatus 220. In some examples, the input interface 240 includes a receiver and/or a modem. The input interface 240 may receive the encoded point cloud data over the link 30 and/or from the storage apparatus 40. The display apparatus 220 may be integrated with the destination apparatus 20 or may be located outside the destination apparatus 20. Generally, the display apparatus 220 displays decoded point cloud data. There may be a plurality of types of display apparatuses 220. For example, the display apparatus 220 may be, for example, a liquid crystal display (liquid crystal display, LCD), a plasma display, an organic light-emitting diode (organic light-emitting diode, OLED) display, or another type of display apparatus.

Although not shown in FIG. 4, in some aspects, the encoder 100 and the decoder 200 may be integrated with an audio encoder and an audio decoder respectively, and may include an appropriate multiplexer-demultiplexer (multiplexer-demultiplexer, MUX-DEMUX) unit or other hardware and software, to process encoding of both audio and a video in a same data stream or separate data streams. In some examples, if appropriate, the MUX-DEMUX unit may comply with the ITU H.223 multiplexer protocol or another protocol such as a user datagram protocol (user datagram protocol, UDP).

The encoder 100 and the decoder 200 each may be implemented as, for example, any one of a plurality of circuits: one or more microprocessors, digital signal processors (digital signal processor, DSP), application-specific integrated circuits (application-specific integrated circuit, ASIC), field-programmable gate arrays (field-programmable gate array, FPGA), discrete logic, hardware, or any combination thereof. If this application is implemented partially through software, the apparatus may store, in an appropriate nonvolatile computer-readable storage medium, an instruction used for the software, and may use one or more processors to execute the instruction in hardware, to implement the technologies in this application. Any one of the foregoing content (including hardware, software, a combination of hardware and software, and the like) may be considered as one or more processors. The encoder 100 and the decoder 200 each may be included in one or more encoders or decoders, and the encoder or the decoder may be integrated as a part of a combined encoder/decoder (codec) in a corresponding apparatus.

In this application, the encoder 100 may be generally an apparatus that "signals" or "sends" some information to another apparatus such as the decoder 200. The term "signal" or "send" may generally refer to transmission of a syntax element and/or other data used for decoding compressed point cloud data. The transmission may occur in real time or almost in real time. Alternatively, the communication may occur after a period of time. For example, the communication may occur when a syntax element in an encoded bitstream is stored into a computer-readable storage medium during encoding, and the decoding apparatus may then retrieve the syntax element at any time after the syntax element is stored in the medium.

Figure 5:
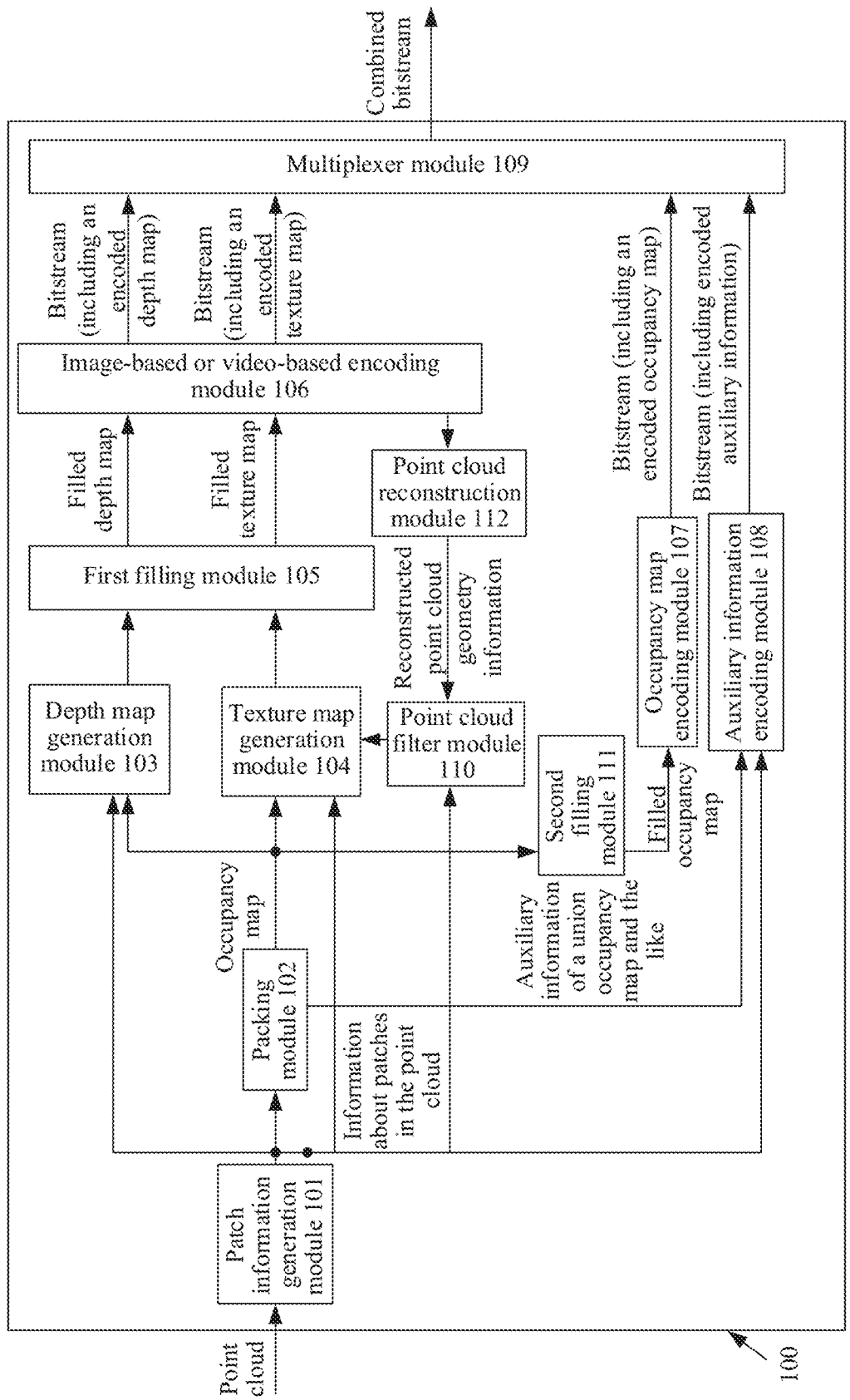
FIG. 5 is a schematic block diagram of an example encoder that is applicable to an embodiment of this application.

FIG. 5 is a schematic block diagram of an example encoder 100 that is applicable to an embodiment of this application. An MPEG (Moving Picture Experts Group) point cloud compression (Point Cloud Compression, PCC) encoding framework is used as an example for description in FIG. 5. In the example in FIG. 5, the encoder 100 may include a patch information generation module 101, a packing module 102, a depth map generation module 103, a texture map generation module 104, a first filling module 105, an image-based or video-based encoding module 106, an occupancy map encoding module 107, an auxiliary information encoding module 108, a multiplexer module 109, and the like. In addition, the encoder 100 may further include a point cloud filter module 110, a second filling module 111, a point cloud reconstruction module 112, and the like.

The patch information generation module 101 is configured to partition one frame of point cloud into a plurality of patches by using a method, and obtain related information and the like of the generated patches. The patch is a set of some points in one frame of point cloud, and generally one connected component region corresponds to one patch. The related information of the patches may include but is not limited to at least one of the following information: a quantity of the patches obtained by partitioning the point cloud, location information of a patch in a three-dimensional space, an index of a normal coordinate axis of the patch, a depth map generated when the patch is projected from the three-dimensional space to a two-dimensional space, a size of the depth map of the patch (for example, the width and the height of the depth map), an occupancy map generated when the patch is projected from the three-dimensional space to the two-dimensional space, and the like. Some of the related information, such as the quantity of the patches obtained by partitioning the point cloud, the index of the normal coordinate axis of the patch, the size of the depth map of the patch, the location information of the patch in the point cloud, and size information of the occupancy map of the patch, may be used as auxiliary information and sent to the auxiliary information encoding module 108 for encoding (that is, compression encoding). An occupancy map of each patch may be sent to the packing module 102 for packing. In addition, information about a specific location of each patch in the occupancy map of the point cloud, a depth map of each patch, and the like may be sent to the depth map generation module 103.

After the packing module 102 obtains the occupancy map of the point cloud, the second filling module 111 may fill the occupancy map of the point cloud and then send a filled occupancy map of the point cloud to the occupancy map encoding module 107 for encoding. In addition, the occupancy map of the point cloud may be used to guide the depth map generation module 103 to generate a depth map of the point cloud and guide the texture map generation module 104 to generate a texture map of the point cloud.

In the technical solutions provided in the embodiments of this application, in an example, the packing module 102 may further send auxiliary information of a union occupancy map generated in a packing process and the like to the auxiliary information encoding module 108, to encode the auxiliary information of the union occupancy map and the like into a bitstream. In this case, there is no need to transmit, in the bitstream, related information of a global matched patch corresponding to the union occupancy map. Therefore, bitstream overheads can be reduced. For the terms and a specific implementation in the technical solutions, refer to the following descriptions. In addition, a module that encodes the auxiliary information of the union occupancy map into the bitstream may alternatively be a module independent of the auxiliary information encoding module 108. This is not limited in this embodiment of this application.

The depth map generation module 103 is configured to: generate the depth map of the point cloud based on the occupancy map of the point cloud, and the occupancy map and depth information of each patch in the point cloud, and send the generated depth map to the first filling module 105, so that the first filling module 105 fills empty pixels in the depth map, to obtain a filled depth map.

The texture map generation module 104 is configured to: generate the texture map of the point cloud based on the occupancy map of the point cloud, and the occupancy map and texture information of each patch in the point cloud, and send the generated texture map to the first filling module 105, so that the first filling module 105 fills empty pixels in the received texture map, to obtain a filled texture map.

The first filling module 105 sends the filled depth map and the filled texture map to the image-based or video-based encoding module 106 for image-based or video-based encoding. Subsequent processes are as follows:

On the one hand, the image-based or video-based encoding module 106, the occupancy map encoding module 107, and the auxiliary information encoding module 108 send obtained encoding results (namely, bitstreams) to the multiplexer module 109, and the multiplexer module 109 combines the encoding results into one bitstream, where the bitstream may be sent to an output interface 140.

On the other hand, the image-based or video-based encoding module 106 sends an obtained encoding result (namely, a bitstream) to the point cloud reconstruction module 112 for point cloud reconstruction, to obtain a reconstructed point cloud (namely, obtain reconstructed geometry information of the point cloud). Specifically, video decoding is performed on an encoded depth map obtained by the image-based or video-based encoding module 106, to obtain a decoded depth map of the point cloud, and the reconstructed geometry information of the point cloud is obtained by using the decoded depth map, the occupancy map of the point cloud, and auxiliary information of each patch. The geometry information of the point cloud is coordinate values of a point in the point cloud (for example, each point in the point cloud) in the three-dimensional space.

Optionally, the point cloud reconstruction module 112 may further send texture information of the point cloud and the reconstructed geometry information of the point cloud to a coloring module. The coloring module is configured to color a reconstructed point cloud to obtain texture information of the reconstructed point cloud.

Optionally, the texture map generation module 104 may further generate the texture map of the point cloud based on information that is obtained by the point cloud filter module 110 by filtering the reconstructed geometry information of the point cloud.

Figure 6:
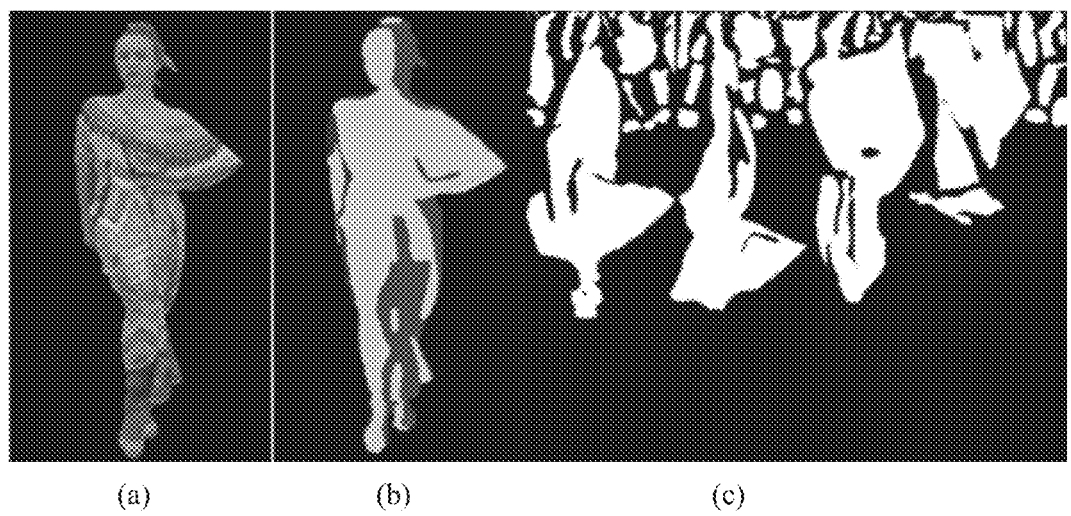
FIG. 6 is a schematic diagram showing examples of a point cloud, a patch, and an occupancy map of the point cloud that are applicable to an embodiment of this application.

FIG. 6 is a schematic diagram showing examples of a point cloud, a patch, and an occupancy map of the point cloud that are applicable to an embodiment of this application. To be specific, (a) in FIG. 6 shows a frame of point cloud; (b) in FIG. 6 shows an obtained patch in the point cloud based on (a) in FIG. 6; and (c) in FIG. 6 shows an occupancy map of the point cloud, where the occupancy map of the point cloud is obtained by packing occupancy maps that are of all patches shown in (b) in FIG. 6 and that are obtained by mapping all the patches onto a two-dimensional plane. The occupancy map of the point cloud shown in (c) in FIG. 6 may be obtained according to the method shown in FIG. 1.

Figure 7:
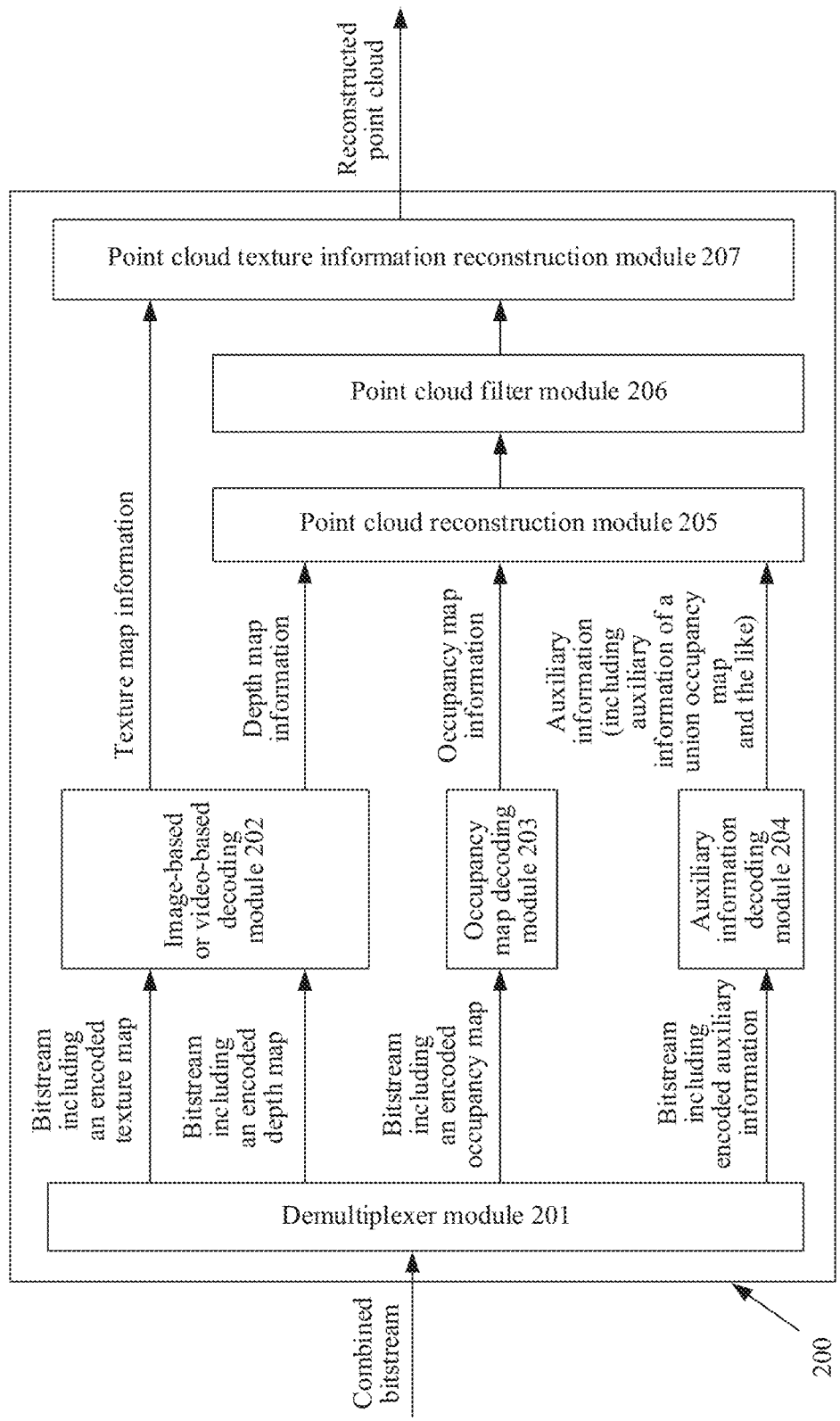
FIG. 7 is a schematic block diagram of an example decoder that is applicable to an embodiment of this application.

FIG. 7 is a schematic block diagram of an example decoder 200 that is applicable to an embodiment of this application. An MPEG PCC decoding framework is used as an example for description in FIG. 7. In the example in FIG. 7, the decoder 200 may include a demultiplexer module 201, an image-based or video-based decoding module 202, an occupancy map decoding module 203, an auxiliary information decoding module 204, a point cloud reconstruction module 205, a point cloud filter module 206, and a point cloud texture information reconstruction module 207.

The demultiplexer module 201 is configured to send an input bitstream (that is, a combined bitstream) to a corresponding decoding module. Specifically, a bitstream including an encoded texture map and a bitstream including an encoded depth map are sent to the image-based or video-based decoding module 202; a bitstream including an encoded occupancy map is sent to the occupancy map decoding module 203; and a bitstream including encoded auxiliary information is sent to the auxiliary information decoding module 204.

The image-based or video-based decoding module 202 is configured to: decode the received encoded texture map and encoded depth map; and then send decoded texture map information to the point cloud texture information reconstruction module 207, and send decoded depth map information to the point cloud reconstruction module 205. The occupancy map decoding module 203 is configured to decode the received bitstream including the encoded occupancy map, and send decoded occupancy map information to the point cloud reconstruction module 205. The auxiliary information decoding module 204 is configured to decode the received encoded auxiliary information, and send, to the point cloud reconstruction module 205, decoded information indicating the auxiliary information.

The point cloud reconstruction module 205 is configured to reconstruct geometry information of a point cloud based on the received occupancy map information and the received auxiliary information. After being filtered by the point cloud filter module 206, reconstructed geometry information of the point cloud is sent to the point cloud texture information reconstruction module 207. In an example, for a reconstruction process performed by the point cloud reconstruction module 205, refer to the foregoing reconstruction process performed by the point cloud reconstruction module 112.

The point cloud texture information reconstruction module 207 is configured to reconstruct texture information of the point cloud, to obtain a reconstructed point cloud.

It may be understood that the decoder 200 shown in FIG. 7 is merely used as an example. In a specific implementation, the decoder 200 may include more or fewer modules than those shown in FIG. 7. This is not limited in this embodiment of this application.

The following describes a point cloud encoding and decoding method, an encoder, and a decoder that are provided in the embodiments of this application with reference to the accompanying drawings.

Figure 8:
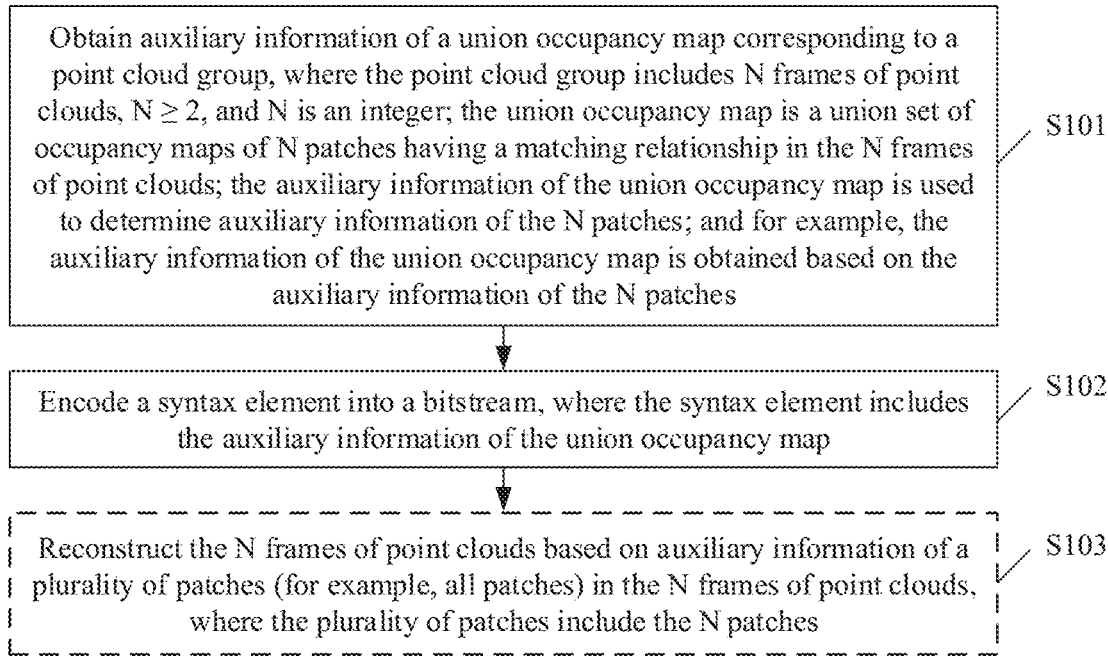
FIG. 8 is a schematic flowchart of a point cloud encoding method according to an embodiment of this application.

FIG. 8 is a schematic flowchart of a point cloud encoding method according to an embodiment of this application. In an example, with reference to FIG. 4, the method shown in FIG. 8 may be performed by the encoder 100. The method shown in FIG. 8 includes the following steps.

S101: Obtain auxiliary information of a union occupancy map corresponding to a point cloud group, where the point cloud group includes N frames of point clouds, N≥2, and N is an integer; the union occupancy map is a union set of occupancy maps of N patches having a matching relationship in the N frames of point clouds; the auxiliary information of the union occupancy map is used to determine auxiliary information of the N patches; and for example, the auxiliary information of the union occupancy map is obtained based on the auxiliary information of the N patches.

The point cloud group includes at least two frames of point clouds, for example, at least two frames of point clouds that are temporally consecutive.

Optionally, the point cloud group may be one or more GOFs, and is usually one GOF. A quantity of frames of point clouds in one GOF is configurable. The quantity of frames of point clouds included in one GOF is not limited in this embodiment of this application. For example, one GOF may include 32 frames of point clouds. For a manner of determining a GOF, refer to the conventional technology.

Optionally, the point cloud group may be a sub-GOF. The sub-GOF may include a plurality of frames of point clouds that are temporally consecutive in one GOF. One GOF may include at least two sub-GOFs. Quantities of frames of point clouds included in any two of the at least two sub-GOFs may be the same or different.

During specific implementation, the encoder and a decoder may partition one GOF into at least two sub-GOFs in a same predefined (for example, predefined by using a protocol) manner. Alternatively, the encoder may partition one GOF into at least two sub-GOFs (for example, partition one GOF into at least two sub-GOFs based on continuity between content of point clouds included in the GOF). Then, the encoder encodes information indicating locations of the at least two sub-GOFs in the GOF (namely, information about specific point clouds included in each sub-GOF) into a bitstream, so that a decoder obtains the locations of the at least two sub-GOFs in the GOF by parsing the bitstream.

Optionally, the information indicating the locations of the at least two sub-GOFs in the GOF may include a number of a start frame (namely, the first frame of point cloud) in each sub-GOF and/or a quantity of frames included in each sub-GOF. It may be understood that a number of a start frame in the first sub-GOF may not be encoded into the bitstream and/or a quantity of frames included in one of the sub-GOFs may not be encoded into the bitstream. The optional embodiment is applicable to a scenario in which quantities of frames included in all of the at least two sub-GOFs are the same, or is applicable to a scenario in which quantities of frames included in some or all of the at least two sub-GOFs are different.

In other words, in an optional implementation, when the point cloud group is the sub-GOF, a syntax element may further include information, such as a number of a start frame included in the sub-GOF and/or a quantity of frames of point clouds included in the sub-GOF, indicating a location that is of each frame of point cloud included in the sub-GOF and that is in a GOF to which the sub-GOF belongs.

Optionally, if the quantities of frames included in all of the at least two sub-GOFs are the same, the information indicating the locations of the at least two sub-GOFs in the GOF may include a quantity of frames of point clouds included in one sub-GOF or a quantity of sub-GOFs included in one GOF.

There may be one or more union occupancy maps corresponding to a point cloud group. For example, with reference to the packing method shown in FIG. 1, there are M union occupancy maps corresponding to the point cloud group. The union occupancy map in S101 may be any union occupancy map corresponding to the point cloud group. For descriptions of related terms such as the union occupancy map and the patches having a matching relationship, refer to the foregoing descriptions. Details are not described herein again.

Each of the N patches in S101 may be considered as a global matched patch described above. Each of the N patches is from one frame of point cloud, and different patches are from different point clouds. For related explanations of the global matched patch, refer to the foregoing descriptions. Details are not described herein again.

The auxiliary information of the union occupancy map is information used to describe the union occupancy map. For example, the auxiliary information of the union occupancy map includes, but is not limited to, at least one of the following information: coordinate values of the union occupancy map in a global occupancy map, size information of the union occupancy map in the global occupancy map, and corresponding coordinate values of the union occupancy map in a three-dimensional space. The global occupancy map is an occupancy map obtained by packing a plurality of union occupancy maps corresponding to the point cloud group. For related descriptions of the global occupancy map, refer to the foregoing descriptions. Details are not described herein again.

The coordinate values of the union occupancy map in the global occupancy map include a coordinate value of the union occupancy map on a U0 axis for the global occupancy map (for example, u0 of the union occupancy map), and/or a coordinate value of the union occupancy map on a V0 axis for the global occupancy map (for example, v0 of the union occupancy map). During specific implementation, the encoder may use a minimum value, a maximum value, or the like of u0 of the occupancy maps of the N patches corresponding to the union occupancy map as u0 of the union occupancy map, and/or use a minimum value, a maximum value, or the like of v0 of the occupancy maps of the N patches corresponding to the union occupancy map as v0 of the union occupancy map.

The size information of the union occupancy map in the global occupancy map includes size information of the union occupancy map on the U0 axis for the global occupancy map (for example, sizeU of the union occupancy map), and/or size information of the union occupancy map on the V0 axis for the global occupancy map (for example, sizeV0 of the union occupancy map). During specific implementation, the encoder may use a maximum value of sizeU0 of the occupancy maps of the N patches corresponding to the union occupancy map as sizeU0 of the union occupancy map, and/or use a maximum value of sizeV0 of the occupancy maps of the N patches corresponding to the union occupancy map as sizeV0 of the union occupancy map.

The corresponding coordinate values of the union occupancy map in the three-dimensional space are minimum (maximum, or the like) coordinate values that are of the N patches corresponding to the union occupancy map and that are in the three-dimensional space. Minimum coordinate values are used as an example. The corresponding coordinate values of the union occupancy map in the three-dimensional space may include a minimum coordinate value of the N patches on a U1 axis in the three-dimensional space (for example, a minimum value of u1), a minimum coordinate value of the N patches on a V1 axis in the three-dimensional space (for example, a minimum value of v1), and/or a minimum coordinate value of the N patches on a D1 axis in the three-dimensional space (for example, a minimum value of d1).

In an implementation scenario, the step S101 of obtaining the auxiliary information of the union occupancy map may be performed after the encoder obtains the union occupancy map. For example, with reference to the packing method shown in FIG. 1, the auxiliary information of the union occupancy map may be obtained in a process of performing the packing method. Certainly, the auxiliary information of the union occupancy map may alternatively be obtained after the packing method is performed. This is not limited in this embodiment of this application.

That the auxiliary information of the union occupancy map is used to determine auxiliary information of the N patches may be understood as follows: The auxiliary information of the union occupancy map is used by the decoder to determine the auxiliary information of the N patches.

For ease of description, in this embodiment of this application, the N patches in S101 are referred to as N patches corresponding to the union occupancy map in S101. A general description is provided herein, and details are not described below.

S102: Encode a syntax element into a bitstream, where the syntax element includes the auxiliary information of the union occupancy map.

In S101 and S102, the point cloud encoding method is described from a perspective of N patches corresponding to a union occupancy map. During specific implementation, for any one or more patches (that is, a global matched patch) corresponding to the union occupancy map in the point cloud group, a point cloud encoding method based on S101 and S102 may be performed. A point cloud encoding method applicable to other patches in the point cloud group is not limited in this embodiment of this application. For example, the other patches may be encoded by using any point cloud encoding method such as an MPEG point cloud encoding method provided in the conventional technology. The other patches may include all non-global matched patches, and may further include a global matched patch other than the global matched patch for which the point cloud encoding method based on S101 and S102 is performed.

During specific implementation, in an example, the encoder may perform S101 and S102 on N patches corresponding to a union occupancy map, and then perform S101 and S102 on N patches corresponding to another union occupancy map, until the encoder performs S101 and S102 on all patches that correspond to union occupancy maps and that need to be encoded by using the technical solution provided in this embodiment of this application. In another example, the encoder may sequentially or simultaneously perform S101 on all patches that correspond to a union occupancy map and that need to be encoded by using the technical solution provided in this embodiment of this application, and then sequentially or simultaneously perform S102 on all the patches corresponding to the union occupancy map. This is not limited in this embodiment of this application.

It may be understood that correlations between the union occupancy map and the occupancy maps of the N patches corresponding to the union occupancy map, for example, location information of the union occupancy map in the global occupancy map, correspond to location information of the occupancy maps of the N patches in occupancy maps of point clouds to which the N patches belong, and/or the union occupancy map is the union set of the occupancy maps of the N patches. Therefore, the auxiliary information of the union occupancy map may be used to represent or approximately represent the auxiliary information of the N patches.

In the point cloud encoding method provided in this embodiment of this application, the encoder encodes the auxiliary information of the union occupancy map into the bitstream, so that the decoder determines, based on the auxiliary information of the union occupancy map, the auxiliary information of the N patches corresponding to the union occupancy map. Compared with a technical solution in the conventional technology in which the auxiliary information of the N patches is directly transmitted in a bitstream, the technical solution provided in this embodiment of this application helps reduce bitstream transmission overheads without affecting encoding and decoding performance.

Optionally, the method shown in FIG. 8 further includes the following step S103:

S103: Reconstruct the N frames of point clouds based on auxiliary information of a plurality of patches (for example, all patches) in the N frames of point clouds, where the plurality of patches include the N patches. For a specific implementation of S103, refer to the foregoing descriptions. Details are not described herein again.

A sequence of performing S101 and S102, and S103 is not limited in this embodiment of this application. For example, S101 and S102 are performed before S103, or S103 is performed before S101 and S102, or S103 and the like are performed in a process of performing S101 and S102.

Optionally, the syntax element in this embodiment shown in FIG. 8 further includes a difference between corresponding auxiliary information of one or more patches (for example, all patches) in the N patches and the auxiliary information of the union occupancy map.

The corresponding auxiliary information of the one or more patches is a same type of auxiliary information as the auxiliary information of the union occupancy map. For example, both the auxiliary information of the union occupancy map and the corresponding auxiliary information of the one or more patches are u0 or v0; or both are sizeU0 or sizeV0; or both are u1, d1, or v1.

The optional implementation may be understood as using a differential manner to transmit the auxiliary information of the one or more patches corresponding to the union occupancy map. Although there are the correlations between the union occupancy map and the occupancy maps of the N patches corresponding to the union occupancy map, the auxiliary information of the union occupancy map may not be exactly the same as the auxiliary information of the N patches. Therefore, the differential manner is used to transmit the auxiliary information of the one or more patches corresponding to the union occupancy map. This helps improve accuracy and/or setting flexibility of the auxiliary information of the one or more patches in the N patches. For example, this can improve accuracy of u0, v1, u1, v1, and/or d1 of the one or more patches. For example, this can improve setting flexibility of sizeU0 and/or sizeV0 of the one or more patches. In other words, sizeU0 of the one or more patches is not necessarily limited to being equal to sizeU0 of the union occupancy map, and/or sizeV0 of the one or more patches is not necessarily limited to being equal to sizeV0 of the union occupancy map.

During specific implementation, whether the syntax element includes the difference between the corresponding auxiliary information of the one or more patches (for example, all patches) in the N patches and the auxiliary information of the union occupancy map may be predefined, for example, predefined by using a protocol. Alternatively, the encoder may encode, into the bitstream, indication information indicating whether the difference is included, and send the bitstream to the decoder.

Figure 9:
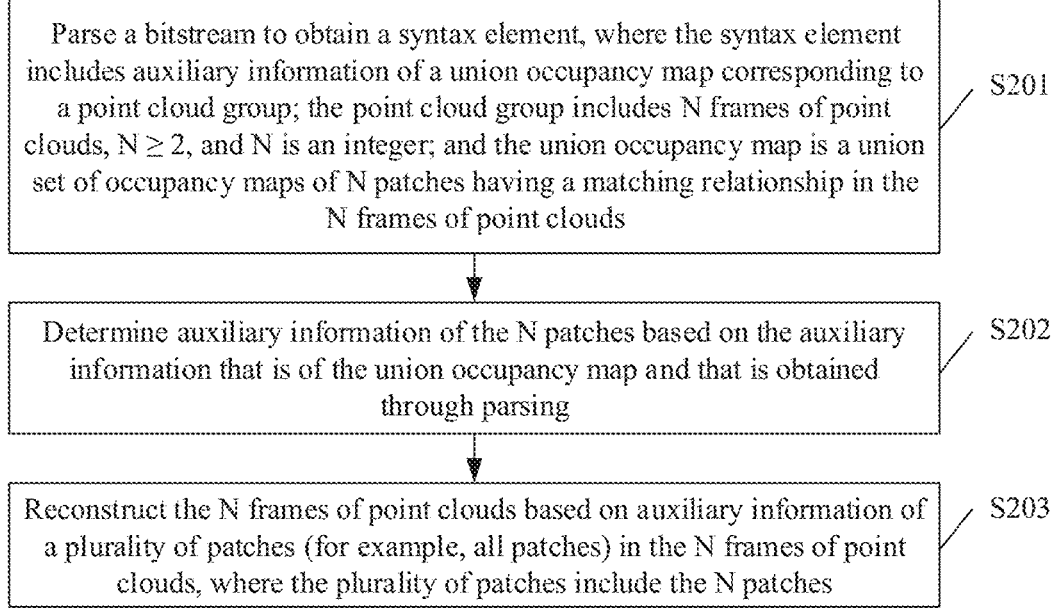
FIG. 9 is a schematic flowchart of a point cloud decoding method according to an embodiment of this application.

FIG. 9 is a schematic flowchart of a point cloud decoding method according to an embodiment of this application. In an example, with reference to FIG. 4, the method shown in FIG. 9 may be performed by the decoder 200. The method shown in FIG. 9 includes the following steps.

S201: Parse a bitstream to obtain a syntax element, where the syntax element includes auxiliary information of a union occupancy map corresponding to a point cloud group; the point cloud group includes N frames of point clouds, N≥2, and N is an integer and the union occupancy map is a union set of occupancy maps of N patches having a matching relationship in the N frames of point clouds.

Optionally, the syntax element further includes a difference between corresponding auxiliary information of one or more patches (for example, all patches) in the N patches and the auxiliary information of the union occupancy map. The optional manner corresponds to the implementation in which the syntax element includes the difference in the embodiment shown in FIG. 8.

S202: Determine auxiliary information of the N patches based on the auxiliary information that is of the union occupancy map and that is obtained through parsing.

For example, if the syntax element includes auxiliary information of any union occupancy map, but does not include a difference between corresponding auxiliary information of any one of N patches corresponding to the union occupancy map and the auxiliary information of the union occupancy map, the decoder may use the auxiliary information of the union occupancy map as corresponding auxiliary information of each patch in the N patches.

For another example, if the syntax element includes auxiliary information of any union occupancy map, and includes a difference between corresponding auxiliary information of one or more patches in N patches corresponding to the union occupancy map and the auxiliary information of the union occupancy map, for each of the one or more patches, the decoder may determine corresponding auxiliary information of the patch based on a difference between the auxiliary information of the union occupancy map and the corresponding auxiliary information of the patch. Specifically, the decoder sums up the auxiliary information of the union occupancy map and the difference, to obtain the corresponding auxiliary information of the patch. Optionally, if the N patches further include other patches in addition to the one or more patches, for each of the other patches, the decoder may use the auxiliary information of the union occupancy map as corresponding auxiliary information of the N patches.

It may be understood that, for each patch corresponding to a non-union occupancy map corresponding to the point cloud group (namely, a non-global matched patch in the point cloud group), a method in the conventional technology may be used by the decoder to parse a bitstream to obtain auxiliary information of the patch.

S203: Reconstruct the N frames of point clouds based on auxiliary information of a plurality of patches (for example, all patches) in the N frames of point clouds, where the plurality of patches include the N patches. For a specific implementation of S203, refer to the foregoing descriptions. Details are not described herein again.

Any point cloud decoding method provided in this embodiment corresponds to the corresponding point cloud encoding method in the embodiment shown in FIG. 8. Therefore, for descriptions of related terms, specific implementations, and beneficial effects in this embodiment, refer to the foregoing point cloud encoding method embodiment. Details are not described herein again. For example, the point cloud group includes a GOF, a sub-GOF, or the like. For how the decoder obtains a location of a sub-GOF in a GOF to which the sub-GOF belongs, refer to the foregoing descriptions. Details are not described herein again. For another example, for related descriptions of the N patches in this embodiment and the like, refer to the foregoing descriptions.

Figure 10:
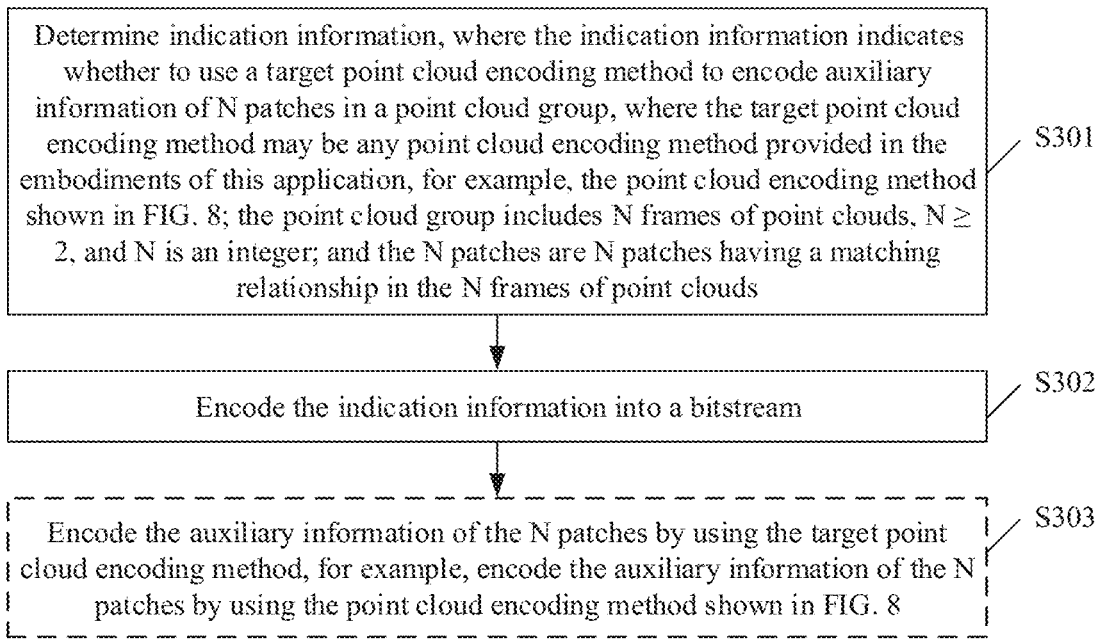
FIG. 10 is a schematic flowchart of another point cloud encoding method according to an embodiment of this application.

FIG. 10 is a schematic flowchart of a point cloud encoding method according to an embodiment of this application. In an example, with reference to FIG. 4, the method shown in FIG. 10 may be performed by the encoder 100. The method shown in FIG. 10 includes the following steps.

S301: Determine indication information, where the indication information indicates whether to use a target point cloud encoding method to encode auxiliary information of N patches in a point cloud group, where the target point cloud encoding method may be any point cloud encoding method provided in the embodiments of this application, for example, the point cloud encoding method shown in FIG. 8; the point cloud group includes N frames of point clouds, N 2, and N is an integer; and the N patches are N patches having a matching relationship in the N frames of point clouds.

During specific implementation, the encoder may support at least two encoding methods. One of the at least two encoding methods may be any point cloud encoding method provided in the embodiments of this application, for example, the point cloud encoding method shown in FIG. 8, and the other point cloud encoding method may be any point cloud encoding method provided in the conventional technology or in the future.

Optionally, the indication information may be an index of the target point cloud encoding method/a target point cloud decoding method. During specific implementation, the encoder and a decoder may predetermine indexes of at least two point cloud encoding/decoding methods supported by the encoder/decoder. Then, after determining a target encoding method, the encoder uses an index of the target encoding method or an index of a decoding method corresponding to the target encoding method as indication information and encodes the index into a bitstream. How the encoder determines which one of the at least two encoding methods supported by the encoder is the target encoding method is not limited in this embodiment of this application. For example, the encoder determines the target encoding method based on bitstream transmission overheads.

S302: Encode the indication information into a bitstream.

During specific implementation, the method further includes the following step S303:

S303: Encode the auxiliary information of the N patches by using the target point cloud encoding method, for example, encode the auxiliary information of the N patches by using the point cloud encoding method shown in FIG. 8.

This embodiment provides a technical solution for selecting a target encoding method. The technical solution is applicable to a scenario in which an encoder supports at least two point cloud encoding methods. In other words, this embodiment of this application is a technical solution supporting an encoder to select a target point cloud encoding method from at least two candidate point cloud encoding methods.

Figure 11:
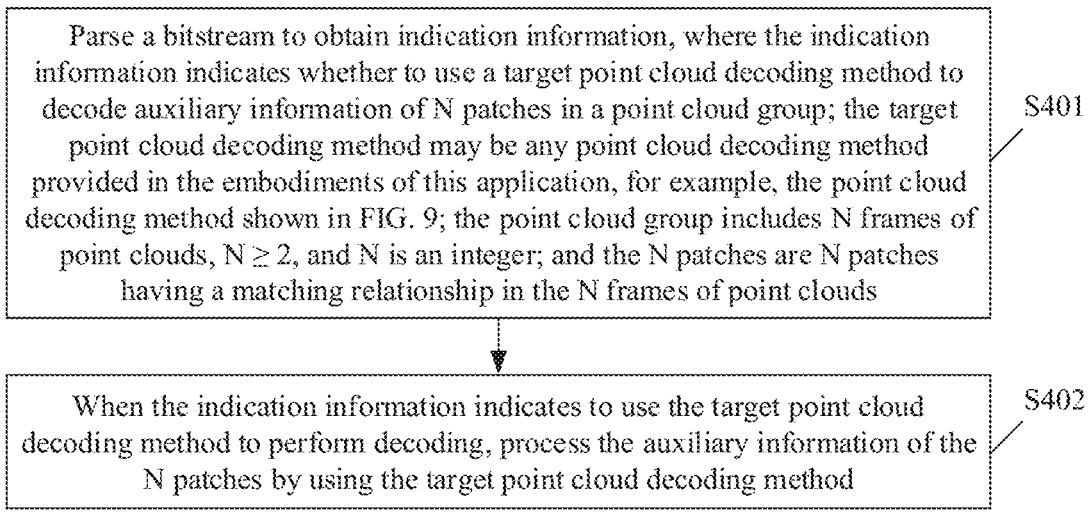
FIG. 11 is a schematic flowchart of another point cloud decoding method according to an embodiment of this application.

FIG. 11 is a schematic flowchart of a point cloud decoding method according to an embodiment of this application. In an example, with reference to FIG. 4, the method shown in FIG. 11 may be performed by the decoder 200. The method shown in FIG. 11 includes the following steps.

S401: Parse a bitstream to obtain indication information, where the indication information indicates whether to use a target point cloud decoding method to decode auxiliary information of N patches in a point cloud group; the target point cloud decoding method may be any point cloud decoding method provided in the embodiments of this application, for example, the point cloud decoding method shown in FIG. 9; the point cloud group includes N frames of point clouds, N≥2, and N is an integer; and the N patches are N patches having a matching relationship in the N frames of point clouds.

S402: When the indication information indicates to use the target point cloud decoding method to perform decoding, process the auxiliary information of the N patches by using the target point cloud decoding method. For details, refer to S201 to S203.

The point cloud decoding method provided in this embodiment corresponds to the point cloud encoding method shown in FIG. 10. Therefore, for explanations of related content, a specific implementation, and descriptions of beneficial effects in this embodiment, refer to the embodiment shown in FIG. 10. This embodiment of this application is a technical solution supporting a decoder to select a target point cloud decoding method from at least two candidate point cloud decoding methods.

In the following, an example in which the point cloud group is a sub-GOF (sub-GOF) is used to describe an example of implementing a format of the foregoing bitstream. Specifically, a format of a bitstream indicating auxiliary information (group_of_frames_auxiliary_information) of a global matched patch in a GOF may be shown in Table 2.

TABLE 2

```
group_of_frames_auxiliary_information( ) {
   for(i = 0, i < group_of_frames_size/subGOFsize; i++) {
      enable_subGOF_global_packing
      If(enable_subGOF_global_packing) {
         subGOF_global_matched_patch_auxiliary_information (i);
         for(j = 0; j < subGOFsize; j++)
         subGOF_frame_auxiliary_information(i* subGOFsize + j, j)
      } else {
         for(j = 0; j < subGOFsize; j++)
         frame_auxiliary_information(j)
}
```

In Table 2, group_of_frames_size represents a quantity of frames of point clouds included in the GOF, and subGOFsize represents a quantity of frames of point clouds included in the sub-GOF.

Based on Table 2, a format of a bitstream indicating auxiliary information (subGOF_global_matched_atch_auxiliary_information) of a global matched patch (that is, global matched patches having a matching relationship) in the sub-GOF may be shown in Table 3.

TABLE 3

```
subGOF_global_matched_patch_auxiliary_information (subGOF_index) {
   global_matched_patch_count
   bit_count_u0
   bit_count_v0
   bit_count_u1
   bit_count_v1
   bit_count_d1
   for(i = 0; i < global_matched_patch_count; i++) {
      unionpatch[i].patch_u0
      unionpatch[i].patch_v0
      unionpatch[i].patch_minimum_u1
      unionpatch[i].patch_minimum_v1
unionpatch[i].patch_minimum_d1
      unionpatch[i].delta_size_u0
      unionpatch[i].delta_size_v0
      unionpatch[i].normal_axis
   }
}
``` global_matched_patch_count represents a quantity of global matched patches in one frame. In Table 3, descriptions are provided by using an example in which u0 and d0 of each global matched patch in a set are transmitted in a differential manner, and corresponding auxiliary information of a union occupancy map corresponding to the set is used as u1, v1, and d1. In addition, unionpatch[i].normal_axis represents an index of a normal coordinate axis for a union occupancy map. It may be understood that normal coordinate axes for all patches corresponding to one union occupancy map are the same. Therefore, the index of the normal coordinate axis for the union occupancy map may be used to represent the normal coordinate axes for all the patches.

Based on Table 2, a format of a bitstream indicating auxiliary information (which is specifically u1, v1, and d1) of each patch in one frame may be shown in Table 4.

TABLE 4

```
subGOF_frame_auxiliary_information(frame_index, sub_frame_index) {
   patch_count
   for(i = 0; i < global_matched_ patch_count; i++) {
      patch[i].delta_u1
      patch[i].delta_v1
      patch[i].delta_d1
```

TABLE 4-continued

```
   }
   for(i = global_matched_patch_count; i < patch_count; i++) {
      Perform encoding by using any existing technical solution
   }
}
```

In Table 4, descriptions are provided by using an example in which u1, v1, and d1 of a global matched patch are transmitted in a differential manner.

The foregoing mainly describes, from a method perspective, the solutions provided in the embodiments of this application. To implement the foregoing functions, corresponding hardware structures and/or software modules for performing the functions are included. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, an encoder and a decoder may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into modules is an example, is merely logical function division, and may be other division in an actual implementation.

Figure 12:
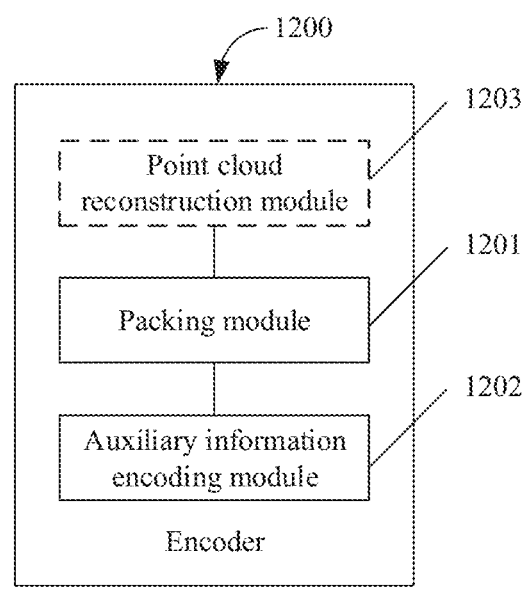
FIG. 12 is a schematic block diagram of an encoder according to an embodiment of this application.

FIG. 12 is a schematic block diagram of an encoder 1200 according to an embodiment of this application. The encoder 1200 may be configured to perform the point cloud encoding method shown in FIG. 8 or FIG. 10. The encoder 1200 includes a packing module 1201 and an auxiliary information encoding module 1202.

In some embodiments, the packing module 1201 is configured to obtain auxiliary information of a union occupancy map corresponding to a point cloud group, where the point cloud group includes N frames of point clouds, N≥2, and N is an integer; the union occupancy map is a union set of occupancy maps of N patches having a matching relationship in the N frames of point clouds; and the auxiliary information of the union occupancy map is used to determine auxiliary information of the N patches. The auxiliary information encoding module 1202 is configured to encode a syntax element into a bitstream, where the syntax element includes the auxiliary information of the union occupancy map. For example, with reference to FIG. 8, the packing module 1201 may be configured to perform S101, and the auxiliary information encoding module 1202 may be configured to perform S102.

Optionally, the auxiliary information of the union occupancy map includes at least one of the following information: coordinate values of the union occupancy map in a global occupancy map, size information of the union occupancy map in the global occupancy map, and corresponding coordinate values of the union occupancy map in a three-dimensional space. The global occupancy map is an occupancy map obtained by packing a plurality of union occupancy maps corresponding to the point cloud group.

Optionally, the syntax element further includes a difference between corresponding auxiliary information of one or more patches in the N patches and the auxiliary information of the union occupancy map.

Optionally, the packing module 1201 is specifically configured to obtain the auxiliary information of the union occupancy map based on the auxiliary information of the N patches.

Optionally, when the auxiliary information of the union occupancy map includes the coordinate values of the union occupancy map in the global occupancy map, the packing module 1201 is specifically configured to use maximum coordinate values or minimum coordinate values of the occupancy maps of the N patches in occupancy maps of corresponding point clouds as the coordinate values of the union occupancy map in the global occupancy map.

Optionally, when the auxiliary information of the union occupancy map includes the size information of the union occupancy map in the global occupancy map, the packing module 1201 is specifically configured to use information about a maximum size of the occupancy maps of the N patches in occupancy maps of corresponding point clouds as the size information of the union occupancy map in the global occupancy map.

Optionally, when the auxiliary information of the union occupancy map includes the corresponding coordinate values of the union occupancy map in the three-dimensional space, the packing module 1201 is specifically configured to use maximum coordinate values or minimum coordinate values of the N patches in corresponding point clouds as the corresponding coordinate values of the union occupancy map in the three-dimensional space.

Optionally, the encoder 1200 further includes a point cloud reconstruction module 1203. The point cloud reconstruction module 1203 is configured to reconstruct the N frames of point clouds based on auxiliary information of a plurality of patches in the N frames of point clouds, where the plurality of patches include the N patches. For example, with reference to FIG. 8, the point cloud reconstruction module 1203 may be configured to perform S103.

Optionally, the point cloud group is a GOF or a sub-GOF, and the sub-GOF includes a plurality of frames of point clouds that are consecutive in one GOF.

Optionally, if the point cloud group is the sub-GOF, the syntax element further includes information, such as a number of a start frame included in the sub-GOF and/or a quantity of frames of point clouds included in the sub-GOF, indicating a location that is of a point cloud (for example, each frame of point cloud) included in the sub-GOF and that is in a GOF to which the sub-GOF belongs. In other words, a location that is of each frame of point cloud included in the sub-GOF and that is in a GOF to which the sub-GOF belongs may be directly or indirectly deduced based on a number of a start frame included in the sub-GOF and/or a quantity of frames of point clouds included in the sub-GOF.

In some other embodiments, the packing module 1201 is configured to determine indication information, where the indication information indicates whether to use a target point cloud encoding method to encode auxiliary information of N patches in a point cloud group; the target point cloud encoding method includes the point cloud encoding method shown in FIG. 10; the point cloud group includes N frames of point clouds, N≥2, and N is an integer; and the N patches are N patches having a matching relationship in the N frames of point clouds. The auxiliary information encoding module 1202 is configured to encode the indication information into a bitstream. During specific implementation, the encoder 1200 further includes a point cloud reconstruction module 1203. The point cloud reconstruction module 1203 is configured to reconstruct the N frames of point clouds based on auxiliary information of a plurality of patches in the N frames of point clouds, where the plurality of patches include the N patches. For example, with reference to FIG. 10, the packing module 1201 may be configured to perform S301, the auxiliary information encoding module 1202 may be configured to perform S302, and the point cloud reconstruction module 1203 may be configured to perform S303.

In an example, the packing module 1201 may correspond to the packing module 102 in FIG. 5, and the auxiliary information encoding module 1202 may correspond to the auxiliary information encoding module 108 in FIG. 5. Certainly, this is not limited thereto. The point cloud reconstruction module 1203 may specifically correspond to the point cloud reconstruction module 112 in FIG. 5. It should be noted that the packing module 1201 may be directly connected to the reconstruction module 1203, or may be indirectly connected to the reconstruction module 1203 through another functional module. For example, for an example of an indirect connection, refer to an indirect connection relationship between the packing module 102 and the point cloud reconstruction module 112 in FIG. 5.

Figure 13:
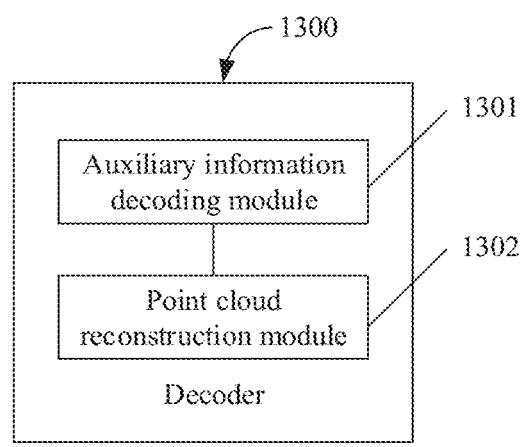
FIG. 13 is a schematic block diagram of a decoder according to an embodiment of this application.

FIG. 13 is a schematic block diagram of a decoder 1300 according to an embodiment of this application. The decoder 1300 may be configured to perform the point cloud decoding method shown in FIG. 9 or FIG. 11. The decoder 1300 includes an auxiliary information decoding module 1301 and a point cloud reconstruction module 1302.

In some embodiments, the auxiliary information decoding module 1301 is configured to: parse a bitstream to obtain a syntax element, where the syntax element includes auxiliary information of a union occupancy map corresponding to a point cloud group; the point cloud group includes N frames of point clouds, N≥2, and N is an integer; and the union occupancy map is a union set of occupancy maps of N patches having a matching relationship in the N frames of point clouds; and determine auxiliary information of the N patches based on the auxiliary information that is of the union occupancy map and that is obtained through parsing. The point cloud reconstruction module 1302 is configured to reconstruct the N frames of point clouds based on auxiliary information of a plurality of patches in the N frames of point clouds, where the plurality of patches include the N patches. For example, with reference to FIG. 9, the auxiliary information decoding module 1301 may be configured to perform S201 and S202, and the point cloud reconstruction module 1302 may be configured to perform S203.

Optionally, the auxiliary information of the union occupancy map includes at least one of the following information: coordinate values of the union occupancy map in a global occupancy map, size information of the union occupancy map in the global occupancy map, and corresponding coordinate values of the union occupancy map in a three-dimensional space. The global occupancy map is an occupancy map obtained by packing a plurality of union occupancy maps corresponding to the point cloud group.

Optionally, the syntax element further includes a difference between corresponding auxiliary information of one or more patches in the N patches and the auxiliary information of the union occupancy map. In this case, in terms of determining the auxiliary information of the N patches based on the auxiliary information that is of the union occupancy map and that is obtained through parsing, the auxiliary information decoding module 1301 is specifically configured to determine the auxiliary information of the N patches based on the auxiliary information that is of the union occupancy map and that is obtained through parsing and the difference between the corresponding auxiliary information of the one or more patches in the N patches and the auxiliary information of the union occupancy map.

Optionally, the point cloud group is a GOF or a sub-GOF, and the sub-GOF includes a plurality of frames of point clouds that are consecutive in one GOF.

Optionally, if the point cloud group is the sub-GOF, the syntax element further includes information, such as a number of a start frame included in the sub-GOF and/or a quantity of frames of point clouds included in the sub-GOF, indicating a location that is of a point cloud (for example, each frame of point cloud) included in the sub-GOF and that is in a GOF to which the sub-GOF belongs. In this case, the auxiliary information decoding module 1301 is further configured to determine, based on the information that is obtained through parsing and that indicates the location that is of the point cloud (for example, each frame of point cloud) included in the sub-GOF and that is in the GOF to which the sub-GOF belongs, the location that is of the point cloud included in the sub-GOF and that is in the GOF to which the sub-GOF belongs.

In some other embodiments, the auxiliary information decoding module 1301 is configured to parse a bitstream to obtain indication information, where the indication information indicates whether to use a target point cloud decoding method to decode auxiliary information of N patches in a point cloud group; the target point cloud decoding method includes the point cloud decoding method shown in FIG. 11; the point cloud group includes N frames of point clouds, N 2, and N is an integer; and the N patches are N patches having a matching relationship in the N frames of point clouds. When the indication information indicates to use the target point cloud decoding method to perform decoding, the auxiliary information decoding module 1301 and the point cloud reconstruction module 1302 process the auxiliary information of the N patches by using the target point cloud decoding method. For example, with reference to FIG. 11, the auxiliary information decoding module 1301 may be configured to perform S401, and the auxiliary information decoding module 1301 and the point cloud reconstruction module 1302 may be configured to perform S402. For steps performed by the auxiliary information decoding module 1301 and the point cloud reconstruction module 1302 in this processing process, refer to the foregoing embodiment. For example, in this processing process, with reference to FIG. 9, the auxiliary information decoding module 1301 may be configured to perform S201 and S202, and the point cloud reconstruction module 1302 may be configured to perform S203.

In an example, the auxiliary information decoding module 1301 may correspond to the auxiliary information decoding module 204 in FIG. 7, and the point cloud reconstruction module 1302 may correspond to the point cloud reconstruction module 205 in FIG. 7.

It may be understood that the modules in the encoder and the decoder in the embodiments of this application are functional entities implementing various execution steps included in the corresponding point cloud encoding method and the corresponding point cloud decoding method in this application, that is, functional entities implementing all the steps in the corresponding point cloud encoding method and the corresponding point cloud decoding method in this application and extensions and variations of these steps. For details, refer to the descriptions of the foregoing point cloud encoding method and the point cloud decoding method in this specification. For brevity, details are not described in this specification again.

Figure 14:
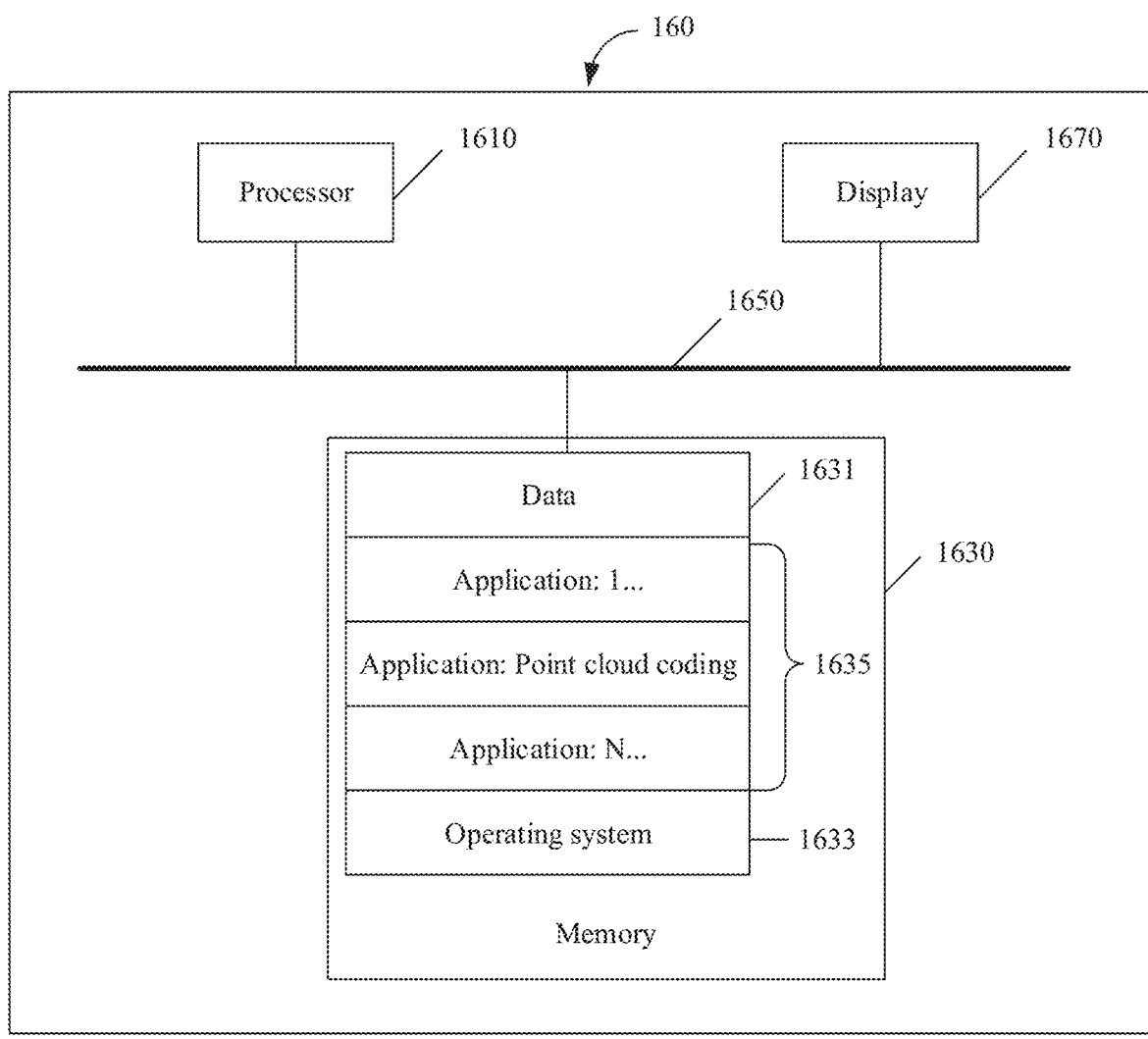
FIG. 14 is a schematic block diagram of a coding device according to an embodiment of this application.

FIG. 14 is a schematic block diagram of an implementation of an encoding device or a decoding device (briefly referred to as a coding device 160 or a point cloud coding device 160) according to an embodiment of this application. The coding device 160 may include a processor 1610, a memory 1630, and a bus system 1650. The processor 1610 and the memory 1630 are connected through the bus system 1650. The memory 1630 is configured to store an instruction. The processor 1610 is configured to execute the instruction stored in the memory 1630, to perform various point cloud encoding methods or point cloud decoding methods described in this application, especially a method for filtering a current image block based on a block size of the current image block. To avoid repetition, details are not described herein again.

In this embodiment of this application, the processor 1610 may be a central processing unit (central processing unit, CPU), or the processor 1610 may be another general-purpose processor, a DSP, an ASIC, an FPGA, another programmable logic device, a discrete gate, a transistor logic device, a discrete hardware component, or the like. The general-purpose processor may be a microprocessor, or the processor may be any conventional processor or the like.

The memory 1630 may include a ROM device or a RAM device. Any other proper type of storage device may also be used as the memory 1630. The memory 1630 may include code and data 1631 that are accessed by the processor 1610 through the bus system 1650. The memory 1630 may further include an operating system 1633 and an application program 1635. The application program 1635 includes at least one program that allows the processor 1610 to perform the point cloud encoding method or the point cloud decoding method described in this application (especially a method for filtering a current image block based on a block size of the current image block described in this application). For example, the application programs 1635 may include applications 1 to N, and further include a point cloud encoding or decoding application (briefly referred to as a point cloud coding application for short) used to perform the point cloud encoding method or the point cloud decoding method described in this application.

In addition to a data bus, the bus system 1650 may further include a power bus, a control bus, a status signal bus, and the like. However, for clear description, the buses are all marked as the bus system 1650 in the figure.

Optionally, the coding device 160 may further include one or more output devices, for example, a display 1670. In an example, the display 1670 may be a touch sensitive display that combines a display and a touch sensitive unit that is operable to sense a touch input. The display 1670 may be connected to the processor 1610 through the bus system 1650.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a DVD, and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field-programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may all be implemented in one or more circuits or logic elements. In an example, various illustrative logical blocks, units, and modules in the encoder 100 and the decoder 200 may be understood as corresponding circuit devices or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A point cloud encoding apparatus, comprising:
   at least one processor; and
   one or more memories coupled to the at least one processor and storing instructions for execution by the at least one processor to:
   obtain auxiliary information of a union occupancy map corresponding to a point cloud group, wherein the point cloud group comprises N frames of point clouds, wherein N≥2, wherein N is an integer, wherein each frame of the N frames of point clouds comprises one or more patches, wherein each patch of the one or more patches is associated with an occupancy map, wherein the union occupancy map corresponds to a union set of N occupancy maps of N patches from the N frames of point clouds respectively, wherein the N patches from the N frames of point clouds have a matching relationship, and wherein the auxiliary information of the union occupancy map is used to determine auxiliary information of the N patches; and
   encode a syntax element into a bitstream, wherein the syntax element comprises the auxiliary information of the union occupancy map.

2. The point cloud encoding apparatus according to claim 1, wherein the auxiliary information of the union occupancy map comprises at least one of the following information: coordinate values of the union occupancy map in a global occupancy map, size information of the union occupancy map in the global occupancy map, and corresponding coordinate values of the union occupancy map in a three-dimensional space; and
   wherein the global occupancy map is an occupancy map obtained by packing a plurality of union occupancy maps corresponding to the point cloud group.

3. The point cloud encoding apparatus according to claim 1, wherein the syntax element further comprises a difference between corresponding auxiliary information of one or more patches in the N patches and the auxiliary information of the union occupancy map.

4. The point cloud encoding apparatus according to claim 1, wherein the one or more memories store the instructions for execution by the at least one processor further to:
   obtain the auxiliary information of the union occupancy map based on the auxiliary information of the N patches.

5. The point cloud encoding apparatus according to claim 4, wherein the one or more memories store the instructions for execution by the at least one processor further to perform at least one of the following:
   when the auxiliary information of the union occupancy map comprises coordinate values of the union occupancy map in a global occupancy map, use maximum coordinate values or minimum coordinate values of the occupancy maps of the N patches in occupancy maps of corresponding point clouds as the coordinate values of the union occupancy map in the global occupancy map;

when the auxiliary information of the union occupancy map comprises size information of the union occupancy map in the global occupancy map, use information about a maximum size of the occupancy maps of the N patches in occupancy maps of corresponding point clouds as the size information of the union occupancy map in the global occupancy map; or when the auxiliary information of the union occupancy map comprises corresponding coordinate values of the union occupancy map in a three-dimensional space, use maximum coordinate values or minimum coordinate values of the N patches in corresponding point clouds as the corresponding coordinate values of the union occupancy map in the three-dimensional space.

6. The point cloud encoding apparatus according to claim 4, wherein the one or more memories store the instructions for execution by the at least one processor further to:
reconstruct the N frames of point clouds based on auxiliary information of a plurality of patches in the N frames of point clouds, wherein the plurality of patches comprise the N patches.

7. The point cloud encoding apparatus according to claim 1, wherein the point cloud group is a group of frames (GOF) or a sub-GOF, and wherein the sub-GOF comprises a plurality of frames of point clouds that are consecutive in one GOF.

8. The point cloud encoding apparatus according to claim 7, wherein if the point cloud group is the sub-GOF, the syntax element further comprises information indicating a location that is of a point cloud comprised in the sub-GOF and that is in a GOF to which the sub-GOF belongs.

9. The point cloud encoding apparatus according to claim 8, wherein the information indicating the location that is of the point cloud comprised in the sub-GOF and that is in the GOF to which the sub-GOF belongs comprises at least one of a number of a start frame comprised in the sub-GOF or a quantity of frames of point clouds comprised in the sub-GOF.

10. A point cloud decoding apparatus, comprising:
at least one processor; and
one or more memories coupled to the at least one processor and storing instructions for execution by the at least one processor to:
parse a bitstream to obtain a syntax element, wherein the syntax element comprises auxiliary information of a union occupancy map corresponding to a point cloud group, wherein the point cloud group comprises N frames of point clouds, wherein N≥2, wherein N is an integer, wherein each frame of the N frames of point clouds comprises one or more patches, wherein each patch of the one or more patches is associated with an occupancy map, wherein the union occupancy map corresponds to a union set of N occupancy maps of N patches from the N frames of point clouds respectively, and wherein the N patches from the N frames of point clouds have a matching relationship;
determine auxiliary information of the N patches based on the auxiliary information that is of the union occupancy map and that is obtained through parsing; and
reconstruct the N frames of point clouds based on auxiliary information of a plurality of patches in the N frames of point clouds, wherein the plurality of patches comprise the N patches.

11. The point cloud decoding apparatus according to claim 10, wherein the auxiliary information of the union occupancy map comprises at least one of the following information: coordinate values of the union occupancy map in a global occupancy map, size information of the union occupancy map in the global occupancy map, and corresponding coordinate values of the union occupancy map in a three-dimensional space; and
wherein the global occupancy map is an occupancy map obtained by packing a plurality of union occupancy maps corresponding to the point cloud group.

12. The point cloud decoding apparatus according to claim 10, wherein the syntax element further comprises a difference between corresponding auxiliary information of one or more patches in the N patches and the auxiliary information of the union occupancy map; and wherein the one or more memories store the instruction for execution by the at least one processor to:
determine the auxiliary information of the N patches based on the auxiliary information that is of the union occupancy map and that is obtained through parsing and the difference between the corresponding auxiliary information of the one or more patches in the N patches and the auxiliary information of the union occupancy map.

13. The point cloud decoding apparatus according to claim 10, wherein the point cloud group is a group of frames (GOF) or a sub-GOF, and wherein the sub-GOF comprises a plurality of frames of point clouds that are consecutive in one GOF.

14. The point cloud decoding apparatus according to claim 13, wherein if the point cloud group is the sub-GOF, the syntax element further comprises information indicating a location that is of a point cloud comprised in the sub-GOF and that is in a GOF to which the sub-GOF belongs; and wherein the one or more memories store the instruction for execution by the at least one processor to:
determine, based on the information that is obtained through parsing and that indicates the location that is of the point cloud comprised in the sub-GOF and that is in the GOF to which the sub-GOF belongs, the location that is of the point cloud comprised in the sub-GOF and that is in the GOF to which the sub-GOF belongs.

15. The point cloud decoding apparatus according to claim 14, wherein the information indicating the location that is of the point cloud comprised in the sub-GOF and that is in the GOF to which the sub-GOF belongs comprises at least one of a number of a start frame comprised in the sub-GOF or a quantity of frames of point clouds comprised in the sub-GOF.

16. A non-transitory computer-readable storage medium, comprising program code, wherein when the program code is run on a computer, the computer is enabled to perform the steps:
obtaining auxiliary information of a union occupancy map corresponding to a point cloud group, wherein the point cloud group comprises N frames of point clouds, wherein N ≥2, wherein N is an integer, wherein each frame of the N frames of point clouds comprises one or more patches, wherein each patch of the one or more patches is associated with an occupancy map, wherein the union occupancy map corresponds to a union set of N occupancy maps of N patches from the N frames of point clouds respectively, wherein the N patches from the N frames of point clouds have a matching relationship, and wherein the auxiliary information of the union occupancy map is used to determine auxiliary information of the N patches; and encoding a syntax element into a bitstream, wherein the syntax element comprises the auxiliary information of the union occupancy map.

17. A non-transitory computer-readable storage medium, comprising program code, wherein when the program code is run on a computer, the computer is enabled to perform the steps:

parsing a bitstream to obtain a syntax element, wherein the syntax element comprises auxiliary information of a union occupancy map corresponding to a point cloud group, wherein the point cloud group comprises N frames of point clouds, wherein $N \geq 2$, wherein N is an integer, wherein each frame of the N frames of point clouds comprises one or more patches, wherein each patch of the one or more patches is associated with an occupancy map, and wherein the union occupancy map corresponds to a union set of N occupancy maps of N patches from the N frames of point clouds respectively, wherein the N patches from the N frames of point clouds have a matching relationship;

determining auxiliary information of the N patches based on the auxiliary information that is of the union occupancy map and that is obtained through parsing; and reconstructing the N frames of point clouds based on auxiliary information of a plurality of patches in the N frames of point clouds, wherein the plurality of patches comprise the N patches.

\* \* \* \* \*

UNITED STATES PATENT AND TRADEMARK OFFICE
CERTIFICATE OF CORRECTION

| | | |
|---|---|---|
| PATENT NO. | : 11,388,442 B2 | Page 1 of 1 |
| APPLICATION NO. | : 17/217404 | |
| DATED | : July 12, 2022 | |
| INVENTOR(S) | : Dejun Zhang, Tian Wang and Vladyslav Zakharchenko | |

It is certified that error appears in the above-identified patent and that said Letters Patent is hereby corrected as shown below:

In the Claims

In Column 34, Line 60, in Claim 16, delete "N $\geq$2," and insert -- N$\geq$2, --.

In Column 35, Line 15, in Claim 17, delete "N $\geq$2," and insert -- N$\geq$2, --.

Signed and Sealed this
Fourth Day of April, 2023

Katherine Kelly Vidal
*Director of the United States Patent and Trademark Office*